United States Patent
Keskar et al.

(10) Patent No.: US 6,721,864 B2
(45) Date of Patent: Apr. 13, 2004

(54) PROGRAMMABLE MEMORY CONTROLLER

(75) Inventors: Shrinath A. Keskar, Sunnyvale, CA (US); Massoud Hadjimohammadi, Morgan Hill, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/115,874

(22) Filed: Apr. 2, 2002

(65) Prior Publication Data

US 2003/0105933 A1 Jun. 5, 2003

Related U.S. Application Data

(63) Continuation of application No. 09/154,842, filed on Sep. 17, 1998, now Pat. No. 6,366,989.

(51) Int. Cl.[7] .............................................. G06F 12/00
(52) U.S. Cl. .................. 711/167; 711/105; 365/230.03; 365/233
(58) Field of Search ...................... 711/167, 156, 711/105; 713/400; 365/189.05–233; 710/49, 129

(56) References Cited

U.S. PATENT DOCUMENTS

| | | | |
|---|---|---|---|
| 3,828,325 A | 8/1974 | Stafford et al. | 710/63 |
| 5,146,592 A | 9/1992 | Pfeiffer et al. | 345/807 |
| 5,239,639 A | 8/1993 | Fischer et al. | 713/600 |
| 5,473,572 A | 12/1995 | Margeson, III | 365/227 |
| 5,548,735 A | 8/1996 | Chen et al. | 710/7 |
| 5,740,466 A | 4/1998 | Geldman et al. | 710/5 |
| 5,764,966 A * | 6/1998 | Mote, Jr. | 713/400 |
| 5,829,035 A | 10/1998 | James et al. | 711/141 |
| 5,941,968 A | 8/1999 | Mergard et al. | 710/308 |
| 5,956,349 A | 9/1999 | Watanabe et al. | 714/718 |
| 6,134,638 A | 10/2000 | Olarig et al. | 710/167 |
| 6,366,989 B1 * | 4/2002 | Keskar et al. | 711/167 |

OTHER PUBLICATIONS

Toshiba Corporation, "MOS Digital Integrated Circuit—TC59S1616AFT, TC59S1608AFT, tC59S1604AFT–10, 12," (Undated) 49 pages.

* cited by examiner

Primary Examiner—Nasser Moazzami
(74) Attorney, Agent, or Firm—Morgan Lewis & Bockius LLP

(57) ABSTRACT

A synchronous dynamic random access memory controller has a high speed interface and a low speed interface. The high speed interface has a buffer with entries for receiving transactions, and the buffer has a valid bit for each entry. The entries store transactions that are received from a high speed bus. The low speed interface retrieves transactions from the buffer. The high speed interface and low speed interface each have state machines that synchronize the high speed and low speed interfaces using the valid bit for each of the entries.

12 Claims, 20 Drawing Sheets

| SDRAM Command | CKE | Current Clock | /CS | /RAS | /CAS | /WE | A12 A13 | A10 | A11 A9-A0 |
|---|---|---|---|---|---|---|---|---|---|
| ACT | H | X | L | L | H | H | V | V | V |
| PAL | H | X | L | L | H | L | X | H | X |
| WRTA | H | X | L | H | L | L | V | H | V |
| RDA | H | X | L | H | L | H | V | H | V |
| CBRR | H | H | L | L | L | H | X | X | X |
| MRS | H | X | L | L | L | L | L | L | V |

FIG. 4

SDC Pins Command Encoding

Legend:

MRS   - Mode Register Set

ACT   - Bank Activate

PAL   - Precharge all banks

WRTA- Write with Auto-Precharge

RDA   - Read with Auto-Precharge

CBRR - CAS before RAS Refresh

| 170 SDC Configuration |
|---|
| RE | SDE | MCF |

FIG. 5B

| 172 Memory Mode |
|---|
| Opcode | Ltmode | WT | BL |

BL = Burst Length - number data beats read or written in a burst cycle
WT = Wrap Type - of a burst cycle: Sequential or Interleave
Ltmode - CAS Latency
Opcode - mode of operation of memory: Normal or Test mode

FIG. 5D

| 112 SDC Registers |
|---|
| SDC Configuration | — 170 |
| Memory Mode | — 172 |
| Base Address Reg 0 | — 174 |
| Base Address Reg 1 | — 176 |
| Timing/Control | — 178 |
| Refresh Interval | — 180 |
| Error Status | — 182 |
| Error Address | — 184 |

FIG. 5A

| 178 Timing/Control |
|---|
| Trrd | Trcd | Trp | Trc | Trsc |

Trrd - number clocks from SDRAM activate to another SDRAM activate command
Trcd - number of clocks from SDRAM activate untile SDRAM read/write command
Trp - number of clocks from SDRAM precharge command until SDRAM activate command
Trc
Trsc - number of clocks from SDRAM mode register set command to any other command to same SDRAM

FIG. 5C

Write Begin Transaction

SDC to SDRAM: Burst read followed by a burst read.

SDC to SDRAM: Burst read followed by a burst write.

Command Queue: Input Fifo: Address and Attribute Path

| 452 State Machine Register | | | | | | |
|---|---|---|---|---|---|---|
| Address | RR | RW | MR | MB | MS | CW |

FIG. 16B

PROGRAMMABLE MEMORY CONTROLLER

This a continuation of application Ser. No. 09/154,842 filed Sep. 17, 1998 now U.S. Pat. No. 6,366,989.

BRIEF DESCRIPTION OF THE INVENTION

This invention relates generally to accessing the primary memory of a computer. More particularly, this invention relates to a technique for improving the interface to a primary memory by providing speed independence between a processor bus and the memory.

BACKGROUND OF THE INVENTION

Computer systems have a central processing unit (CPU) and a memory. When a CPU accesses memory, the memory responds within a certain period of time, referred to as latency response time. When memory is directly connected to the CPU via a system bus, the CPU often must wait for the memory to retrieve or store the data before continuing to execute the next instruction. To reduce the latency between the CPU and the memory, computer systems can use memory controllers as an interface between the CPU and the memory.

Three dimensional graphics and multimedia applications require fast execution. Target performance goals are ever-increasing and handling of multiple real-time audio and video streams simultaneously poses architectural challenges beyond pure computational capacity. To support an interactive graphics environment with real-time constraints, multiple high-bandwidth data streams must be managed efficiently and with low latency response time.

Memories respond to commands—typically read and write commands to retrieve and store data. When the memory controller accesses the memory with an command, the memory controller waits for the command to complete before outputting the next command. Waiting for each command to complete before outputting the next command takes a certain amount of time.

Synchronous dynamic random access memories (SDRAMs) offer improved latency response time and are available in various sizes. Different applications require different types and configurations of SDRAMs. SDRAMs operate at a much slower speed than that of the system bus.

In view of the foregoing, it would be highly desirable to improve computer system performance by reducing the latency between the CPU and memory by providing an interface to the CPU that operates independent of the SDRAM speed. It would also be highly desirable to provide a memory controller that can be programmed to support multiple arrays of SDRAMs, different types of SDRAMs, different SDRAM configurations and different clock frequencies. It would also be highly desirable to improve computer system performance by integrating a memory controller on a single die with the central processing unit to further improve the speed of transactions between the CPU and memory controller.

SUMMARY OF THE INVENTION

A synchronous dynamic random access memory controller has a high speed interface and a low speed interface. The high speed interface has a buffer with entries for receiving transactions, and the buffer has a valid bit for each entry. The entries store transactions that are received from a high speed bus. The low speed interface retrieves transactions from the buffer. The high speed interface and low speed interface each have state machines that synchronize the high speed and low speed interfaces using the valid bit for each of the entries.

The invention realizes improved computer system performance by providing a high speed interface and low speed interface. Each interface has state machines that operate independently of each other and are synchronized via a "valid" bit. By providing independent state machines, the memory controller reduces the time between consecutive transactions and thus reduces the latency response time.

In addition, the memory controller is programmable to support multiple arrays of SDRAMs, different types of SDRAMs, different SDRAM configurations and different clock frequencies. System performance is further improved by integrating the memory controller on a single die with the central processing unit which improves the speed of transactions between the CPU and memory controller.

BRIEF DESCRIPTION OF THE DRAWINGS

For a better understanding of the invention, reference should be made to the following detailed description taken in conjunction with the accompanying drawings, in which:

FIG. 4 is a table of SDRAM commands implemented by the SDC and the mapping of each command to SDRAM control and address signals.

FIG. 5A illustrates the SDC registers.

FIG. 5B illustrates an SDC configuration register.

FIG. 5C illustrates an SDC timing/control register.

FIG. 5D illustrates an SDC memory mode register.

FIG. 16B shows an exemplary state machine register of the memory sequencer.

Like reference numerals refer to corresponding parts throughout the drawings.

DETAILED DESCRIPTION OF THE INVENTION

Figure 1:
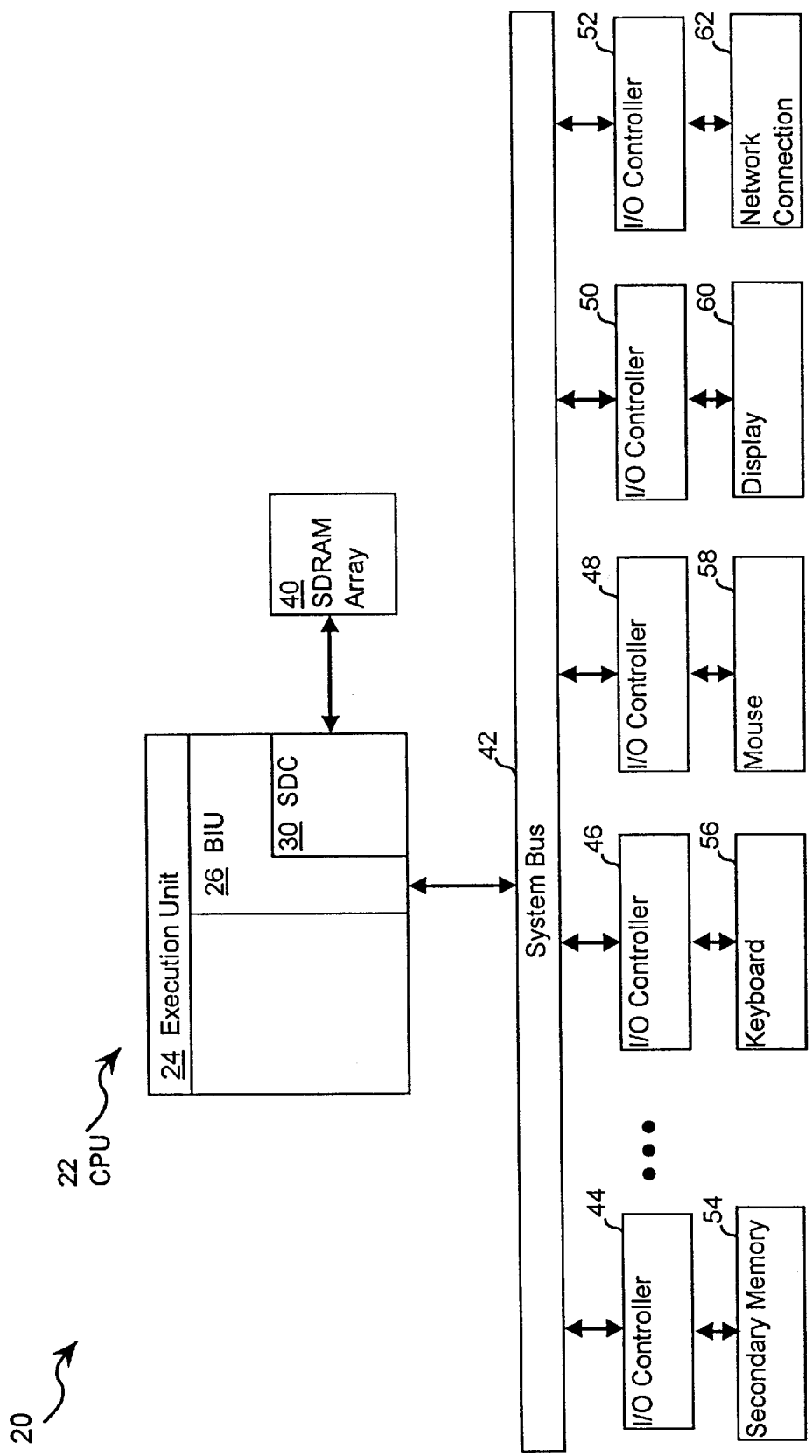
FIG. 1 is a block diagram of a system constructed in accordance with an embodiment of the invention.

FIG. 1 illustrates a general purpose computer 20 in accordance with an embodiment of the present invention. The computer 20 includes a CPU 22. The CPU 22 has an execution unit 24, bus interface unit (BIU) 26 and a SDC 30. The execution unit 24 of the CPU 22 executes instructions of a computer program.

The SDC 30 connects to the SDRAM memory 40. Each instruction is stored at a memory address. Similarly, the data associated with an instruction is stored at another memory address.

To fetch an instruction or data that is stored at a specific memory address, the CPU 22 outputs a transaction via the BIU 26 to the SDC 30. The SDC 30 provides the interface between the BIU 26 and the SDRAM 40.

A system bus 42 connects the CPU 22 to additional devices via input/output (I/O) controllers 44, 46, 48, 50 and 52. For example, the devices can include secondary memory 54, a keyboard 56, a mouse 58, a display 60 and a network connection 62.

The CPU 22 has an integrated execution unit 24, BIU 26 and SDC 30 on a single chip or die. Therefore, the SDC 30 is closely linked with the execution unit 24 and other units with high bandwidth, low latency communication channels.

Figure 2:
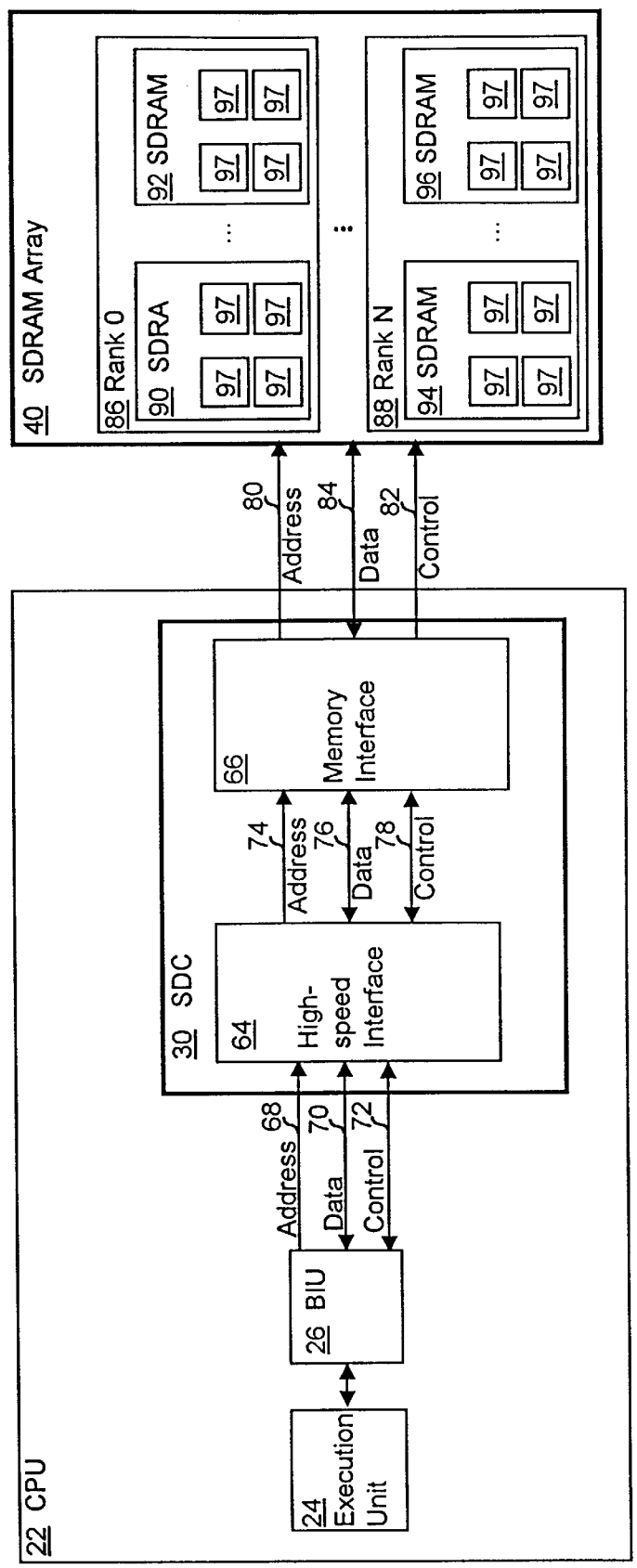
FIG. 2 is a block diagram of a synchronous dynamic random access memory controller (SDC) connected to a SDRAM array, in accordance with an embodiment of the invention.

FIG. 2 illustrates the overall architecture of the SDC 30 in an exemplary configuration with the BIU 26 and an exemplary SDRAM array 40. The SDC 30 has a high-speed interface unit 64 and a low-speed memory interface 66. The BIU 26 and high-speed interface 64 of the SDC 30 communicate over address bus 68, data bus 70 and control signal bus 72. Within the SDC 30, the high-speed interface 64 communicates with the memory interface 66 over internal SDC address bus 74, data bus 76 and control signals 78. The memory interface 66 outputs the desired SDRAM address over the SDRAM address bus 80 and the appropriate control signals on the control signal bus 82. For SDRAM write accesses, the memory interface 66 outputs the data to be stored in the SDRAM on the data bus 84. For SDRAM read accesses, the memory interface 66 receives the data from the SDRAM over data bus 84.

The high-speed interface unit 64 operates at the processor speed, that is, the speed of the execution unit 24 of the CPU 22. The memory interface 66 operates at the speed of the SDRAM memory 40 which is typically slower than the processor speed.

FIG. 2 also illustrates an exemplary configuration of the SDRAM memory array 40. The SDRAM memory array 40 is organized into any number (N) of ranks 86, 88. In one embodiment, the SDRAM memory 40 has two ranks. Each rank 86, 88 has a predetermined number of SDRAM devices 90, 92, 94, 96. Each SDRAM device 90, 92, 94, 96 has internal banks 97. The SDRAM devices 90, 92, 94, 96 can have any number (N) of internal banks. In one embodiment, the SDRAM devices have four internal banks. To access a desired memory location, SDRAMs are typically supplied with a row and column address, and an internal bank is selected.

The preferable configurations of the SDRAM array 40 are summarized below in Table 1. All SDRAM devices shown in Table 1 have four internal banks.

TABLE 1

| Type of SDRAM device | Number of devices in a rank | Rank Size (64-bit wide data bus) | Row × Column × Bank Select bits | Maximum Memory (2 ranks) |
|---|---|---|---|---|
| 64 Mbit × 4 | 16 | 128 Mbyte | 12 × 10 × 2 | 256 Mbyte |
| 64 Mbit × 8 | 8 | 64 Mbyte | 12 × 9 × 2 | 128 Mbyte |
| 64 Mbit × 16 | 4 | 32 Mbyte | 12 × 8 × 2 | 64 Mbyte |
| 64 Mbit × 32 | 2 | 16 Mbyte | 12 × 7 × 2 | 32 Mbyte |
| 128 Mbit × 4 | 16 | 256 Mbyte | 12 × 11 × 2 | 512 Mbyte |
| 128 Mbit × 8 | 8 | 128 Mbyte | 12 × 10 × 2 | 256 Mbyte |
| 128 Mbit × 16 | 4 | 64 Mbyte | 12 × 9 × 2 | 128 Mbyte |

Figure 3A:
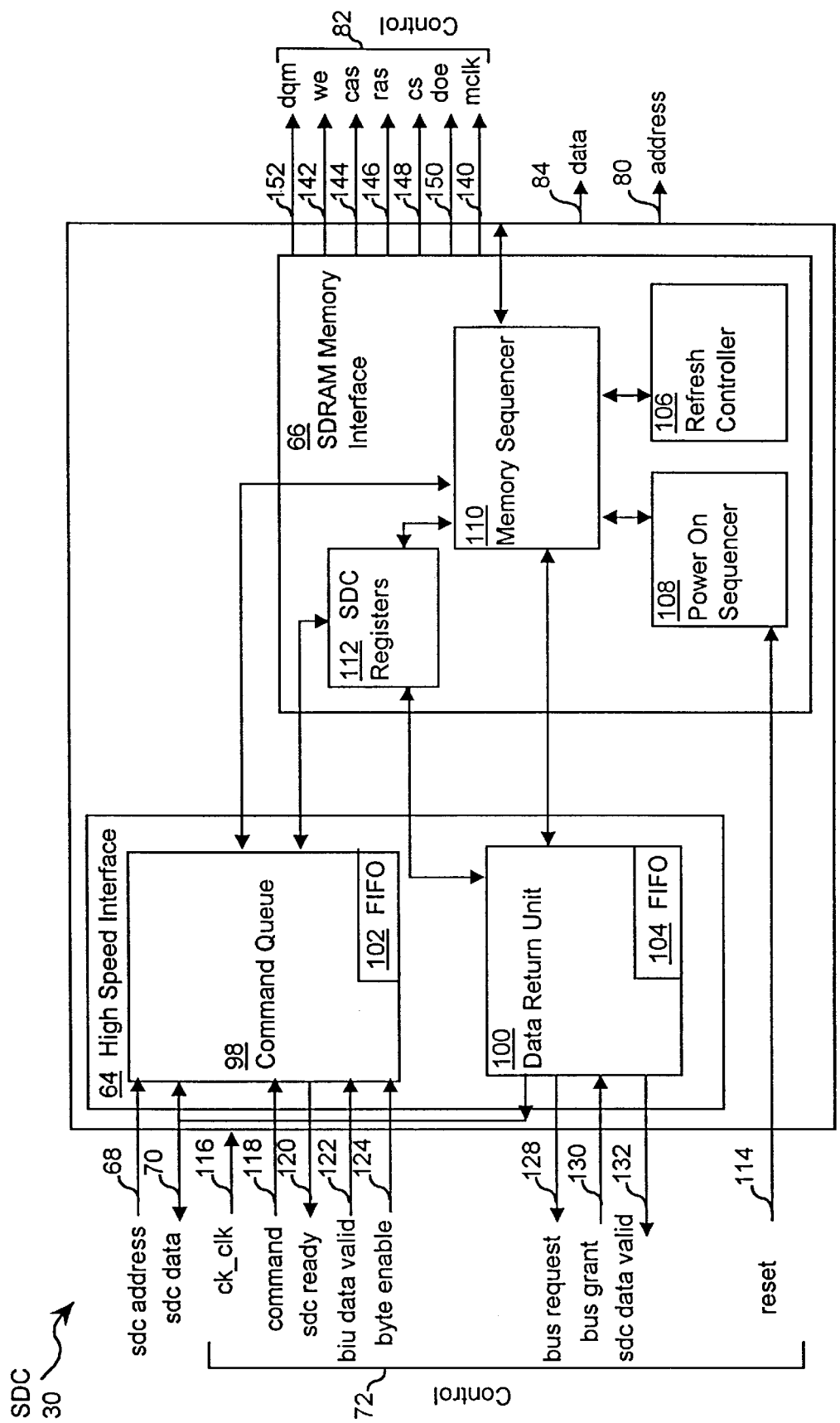
FIG. 3A is a block diagram of the SDC showing input and output signals.

FIG. 3A is a block diagram of the internal architecture of the SDC and also shows the external signals.

The high-speed interface 64 has a command queue 98 and a data return unit 100. The command queue 98 has a buffer such as a FIFO 102 and receives transactions and data from the BIU. The data return unit 100 has a buffer such as a FIFO 104 and sends retrieved data to the BIU in response to a read transaction.

The memory interface 66 has a refresh controller 106, a power on sequencer 108, a memory sequencer 110 and SDC internal programmable registers 112.

As discussed above, the BIU communicates with the SDC using an address signal (sdc address) on line 68, data signals (sdc data) on line 70 and control signals 72. A reset signal on line 114 provides a hardware reset to the SDC, and connects to the power on sequencer 108 and other units within the SDC. A ck_clk signal on line 116 runs at a processor speed.

The address signals on line 68 and certain control signals connect to the command queue 98. The control signals 68 include: a command signal on line 118, an sdc ready signal on line 120 and biu data valid signal on line 122. The sdc data signal on bus 70 and the byte enable signal on line 124 connect to the command queue 98.

The sdc data bus line 70 also connects to the data return unit 100. Other control lines connected to the data return unit 100 in a bus request line 128, a bus grant line 130 and a sdc data valid line 132.

The memory sequencer 110 outputs an address on bus 80, control signals on lines 140–152 and data on bus 84 to the SDRAM array. The control signals include a memory clock (mclk) signal on line 140, a write enable (we) signal on line 142, a column address strobe (cas) on line 144, a row address strobe (ras) on line 146, a chip select (cs) signal on line 148, a doe signal on line 150 and a dqm signal on line 152.

Transactions

The SDC has two transaction categories: 1) transactions that access the SDC's internal programmable registers, and 2) transactions that access the main memory. The programmable registers are addressed like the main memory (memory-mapped). Therefore, the SDC decodes two kinds of addressable memory spaces: a main memory space that is used to access the SDRAM and a programmable register space that is used to access the SDC's internal programmable registers.

BIU-SDC

To read from or write to the SDRAM, the SDRAM transactions include—Read Begin, Read End and Write Begin. A read is a split transaction made up of the read begin and a read end transaction. The Read Begin is a command initiated via the BIU to the SDC to fetch data from the SDRAM memory. The Read End is a command initiated by the SDC to the BIU to return the data fetched from the memory in response to a Read Begin command. A Write Begin is a command initiated via the BIU to store data in the memory.

A burst command reads or writes a group of data beats in a single BIU transaction or SDRAM access. A "beat" corresponds to the data that can be read from or written to a single memory address. In the present invention, a beat is up to eight bytes wide (sixty-four bits).

The Read Begin command has several variations: Burst, Critical-data-first and Register reads. In a burst read, the SDC queues all data beats that were retrieved from the memory in a buffer before outputting the data beats to the BIU. The critical-data-first read returns the first data beat as soon as the SDC retrieves it from the SDRAM instead of accumulating all data beats in the burst. Some execution units inside the CPU need data immediately and cannot wait for all the data to be retrieved from the SDRAM. The SDC register reads and loads single beat transactions that read or write one data beat.

SDC Command Queue

The SDC command queue 98 accepts read and write begin transactions from the BIU 26. The SDC command queue 102 acts as a buffer between the execution unit which operates at a fast processor clock speed and the slower SDRAM which operates at a slower memory clock speed. The SDC command queue 102 accepts transactions from the CPU's internal system bus via the BIU and, when the FIFO is empty, operates at the processor clock speed. The transactions are available to be fetched from the fifo 102 by the memory sequencer 110 as soon as they are received.

Figure 3B:
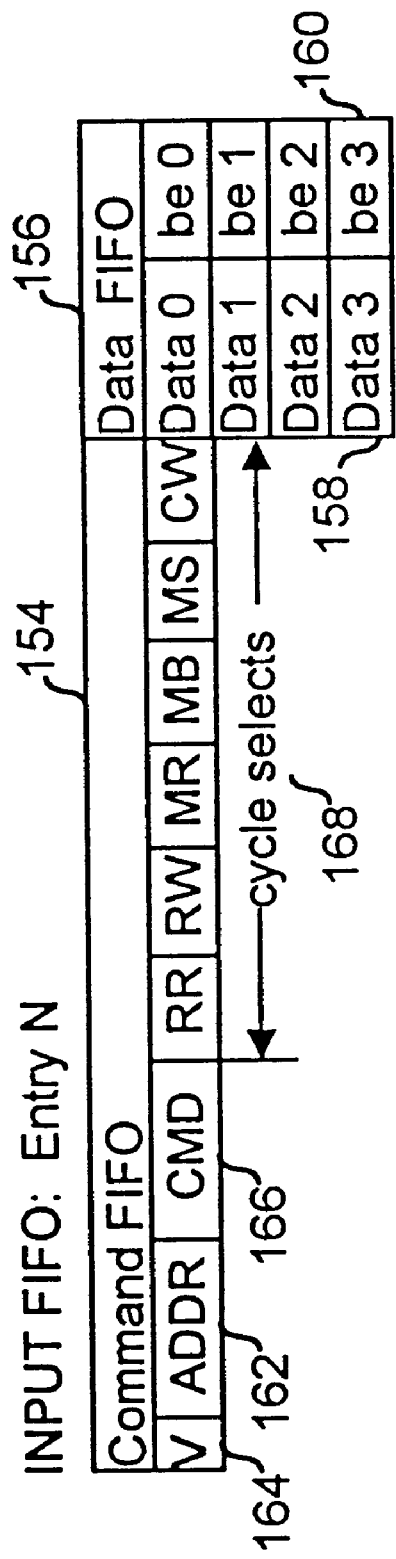
FIG. 3B illustrates an exemplary entry of an input fifo of a command queue.

FIG. 3B shows the fields of an entry of the input fifo 102 of the command queue 98. The input fifo 102 has a command portion (command fifo) 154 for storing command and address information and a data portion (data fifo) 156 for storing data. The data portion stores data beats 158 and any corresponding byte enables 160 if applicable. In a preferred embodiment, up to four data beats, data 0 through data 3, can be stored, along with their byte enables, be 0 through be 3, in the data fifo 156 for each command in the command fifo 154.

Although the input fifo 102 can have any number (N) of entries, in a preferred embodiment, the input fifo stores four entries. Each entry of the data portion 156 of the input fifo 102 corresponds to a cache-line of data. Byte enables are used for partial writes in which a portion of the bytes of a data beat are written.

The Command Fifo 154 stores the received address (ADDR) 162, a valid bit (V) 164, the received command 166 and cycle selects 168 for each entry. The cycle selects 168 include: RR, RW MR, MB, MS and CW bits. The cycle selects will be described in further detail below.

The SDC command queue 98 is coupled to the data return unit 100 such that the timing of a Read Begin transaction from the BIU can overlap a Read End transaction from a prior Read Begin to the BIU.

The SDC Data Return Unit

The SDC data return unit 100 of FIG. 3A initiates the read end transaction between the SDC and the BIU to return data in response to the read begin transaction. The data return unit uses handshake signals with the BIU to request use of the BIU data bus, and waits for the BIU to assert the bus grant signal 130 to return the data to the original requestor. The data return unit has a buffer or fifo 104, which stores up to four data beats.

The SDC processes transactions in the same order in which the transactions were received. Therefore the SDC will output the read end transactions in the same order that the SDC received the read begin transactions.

The Memory Interface

The SDC Memory Sequencer

The memory sequencer 110 removes incoming transactions that access the SDRAM from the command queue 102, maps the incoming transactions into SDRAM commands, and schedules the SDRAM commands for output to the SDRAM array 40. The memory sequencer 110 pipelines transactions to maximize the utilization of the SDRAM data bus while meeting the SDRAM timing constraints. The memory sequencer 110 will be further explained below.

SDRAM Commands

FIG. 4 is a table of the SDRAM commands output by the SDC and the mapping of the commands to SDRAM control and address signals. In FIG. 4, an "H" means that the signal has a high voltage level corresponding to a logical 1, and an "L" means that a signal has a low voltage level corresponding to a logical 0. An "X" is a don't-care condition in which the voltage level is irrelevant. Each SDRAM command corresponds to a set of signals on the address and control pins. Each set of signals has a unique set of voltage levels for each SDRAM command.

The Bank Activate (ACT) command activates the bank designated by the Bank Select signal of the SDRAM. In one embodiment, the SDC address bus connects to the SDRAM bank select signals, and consequently the bank select signals are used as part of the SDC's SDRAM addressing scheme.

The precharge all banks (PAL) command precharges all of an SDRAM's internal banks simultaneously.

The write with auto-precharge (WRTA) command automatically performs a precharge operation after a write.

The read with auto-precharge (RDA) command automatically performs a precharge operation after a read.

The CAS before RAS Refresh (CBRR) command is used to refresh the row address in all memory banks as provided by an internal refresh counter in the SDRAM.

The Mode Register Set (MRS) command is used to configure the SDRAM. The MRS command is used to set the values of the CAS latency, the addressing mode and burst length in the SDRAM's internal mode register. The SDC issues a MRS command at the end of a power-on sequence.

SDC Registers

FIG. 5A shows the SDC registers 112: an SDC Configuration register 170, a memory mode register 172, Base Address register zero 174, Base Address register one 176, a timing/control register 178, a refresh interval register 180, error status register 182 and error address register 184. The SDC registers 112 are memory-mapped.

The Configuration Register

FIG. 5B illustrates the configuration register 170 of FIG. 5A. The configuration register has refresh enable (RE), SDC enable (SDE) and memory clock frequency (MCF) bits.

SDRAMs synchronize their operation to the memory clock signal (mclk 140 in FIG. 3); and the SDC 30 supplies the memory clock signal to the SDRAM 40.

The SDC can be programmed to select a desired memory clock speed using the MCF bits. The memory clock is derived by dividing the CPU clock (ck_clk 116 on FIG. 3) by a predetermined value corresponding to the MCF bits as shown in Table 2 below.

TABLE 2

| MCF bits | Divide by value | Example: For a 400 MHz CPU clock, the Memory clock speed is |
|---|---|---|
| 000 | 6 | 66 MHz |
| 001 | 4 | 100 MHz |
| 010 | 3 | 133 MHz |
| 011 | 2.5 | 160 MHz |
| 100 | 2 | 200 MHz |

For example, when the MCF bits are "001", a 400 MHz input clock will be divided by four to output a 100 MHz memory clock.

Since the memory clock output by the SDC is programmable, the SDC can be used in different systems that use different SDRAM speeds.

The SDC enable (SDE) bit enables or disables the SDC. The SDE bit is used as a trigger for the power-on sequence of the SDRAM memory. The SDE bit is sampled only after the SDC is reset. The state of the SDE bit is ignored during normal operation.

The SDC can also be programmed to enable or disable an SDRAM's internal refresh capability using the refresh enable (RE) bit. When the RE bit is low, the SDRAM memory is not refreshed by the SDC but by an external source.

The Timing/Control Register

FIG. 5C illustrates the timing/control register 170 of FIG. 5A. The timing/control register 170 has five programmable fields.

Trrd—the number of memory clock cycles between SDRAM activate commands.

Trcd—the number of memory clock cycles from an SDRAM activate command until an SDRAM read/write command.

Trp—the number of memory clock cycles from SDRAM precharge command until an SDRAM activate command.

Trc—The number of memory clock cycles from a refresh command to either another refresh command or an activate command.

Trsc—the number of memory clock cycles from the SDRAM mode register set (MRS) command to any other command to the same SDRAM.

The Memory Mode Register

FIG. 5D illustrates the memory mode register 172 of FIG. 5A. The memory mode register 172 is programmable and is used to set five parameters:

Burst Length (BL) is the number of data beats read or written in a burst cycle.

Wrap Type (WT) is the wrap type of a burst cycle: sequential or interleave.

Tcl (Ltmode) is the column address strobe (CAS) latency.

Opcode is the mode of memory operation: normal or a test mode.

The Base Address Registers

The base address registers, SDC_BAR0 174 and SDC_BAR1 176, are used to program and store the following fields:

BADDR—The base address of a rank.

RSIZ—The size of a rank. The RSIZ field also corresponds to the type of SDRAM device(s) used. See Table 3 below:

TABLE 3

| RSIZ | Rank Size | Device Use |
|---|---|---|
| 000 | 16 Mbytes | 64 Mbit × 32 |
| 001 | 32 Mbytes | 64 Mbit × 16 |
| 010 | 64 Mbytes | 64 Mbit × 8, 128 Mbit × 16 |
| 011 | 128 Mbytes | 64 Mbit × 4, 128 Mbit × 8 |
| 100 | 256 Mbytes | 128 Mbit × 4 |

RE—A Rank Enable bit which enables or disables the respective rank.

The Refresh Interval Register

The refresh interval is programmable. The SDC refresh interval register 180 is loaded with and stores the refresh interval period for the SDC. The refresh interval is the number of memory clock cycles between CBR refresh cycles. One row is refreshed during each CBR refresh cycle. The refresh period depends on the memory clock frequency and the requirements of the specific type of SDRAM used.

Power on Sequencer

At system reset, the initialization software (boot code) configures the programmable parameters of the SDC programmable registers. After all memory parameters are configured, then the initialization software sets the SDE bit in the SDC Configuration register 120 to enable the memory interface. After the SDE bit is enabled, the SDC power on sequencer issues the following sequence of commands to the SDRAM:

Precharge all banks (PAL),

Mode register set (MRS) to set the SDRAM memory mode register, and

Two refresh (CBR) commands.

The SDC Memory Refresh Unit

The SDC refresh unit 106 has refresh timers and generates periodic self refresh cycles on the SDRAM data bus. The SDC supplies CAS before RAS (CBR) refresh to the SDRAM according to the interval specified in the SDC refresh interval register 180. The value stored in the refresh interval register represents the number of memory clock cycles required between CBR refreshes and depends on the requirements of the SDRAM device.

If a burst read is in progress when a refresh operation is to be performed, the refresh unit waits for the read to complete.

The value stored in the refresh interval register 180 should equal:

(number of clock cycles per row refresh)−(number of clock cycles required by the longest access time).

For refresh staggering when two SDRAMs are enabled, the refresh interval should equal:

(the number of clock cycles per row refresh−minus the number of clock cycles required by the longest access time)/2.

Write Begin

Figure 6:
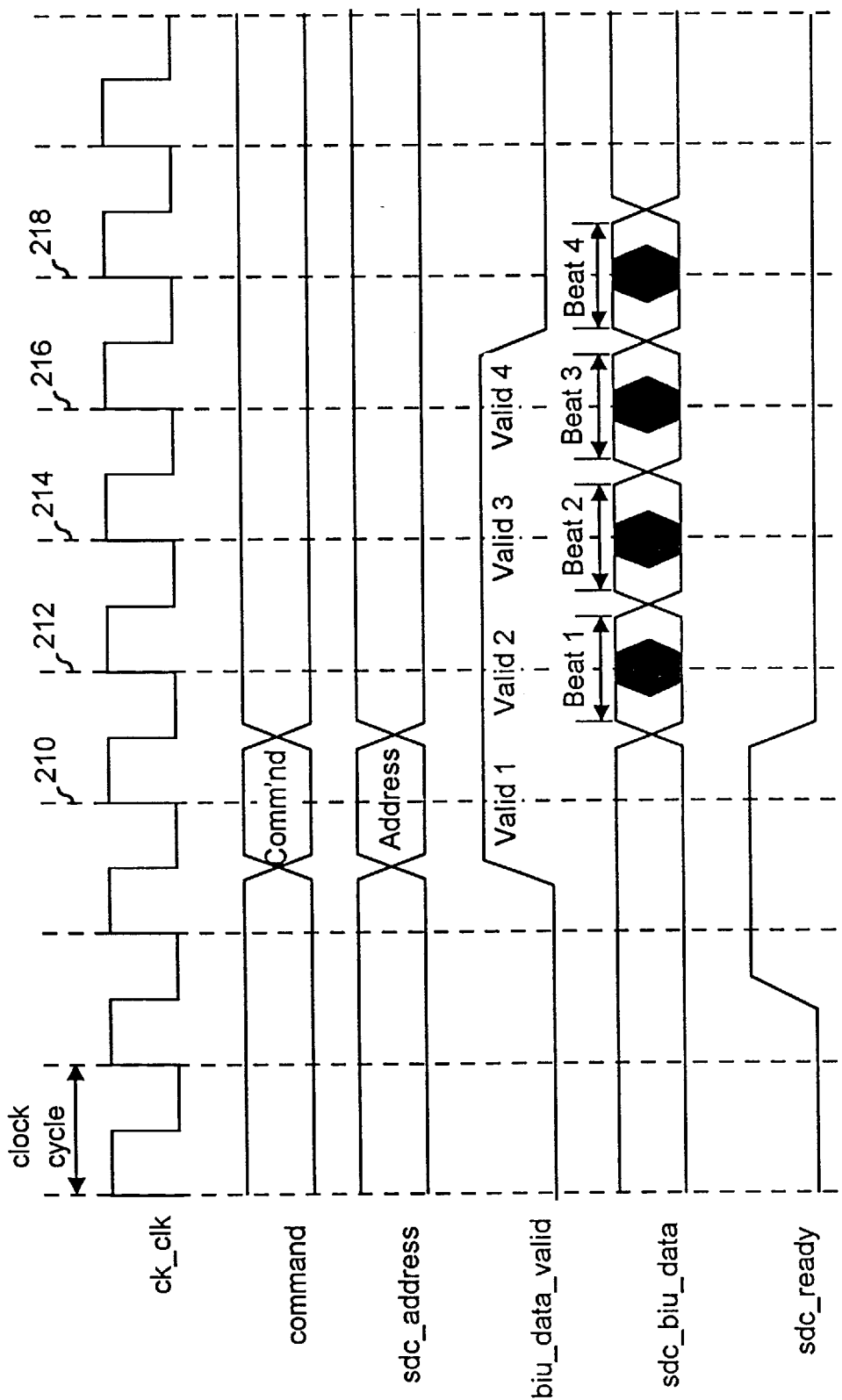
FIG. 6 is a timing diagram of a "write begin" transaction from a bus interface unit (BIU) to the SDC.

FIG. 6 is a timing diagram of a "write begin" transaction from the BIU showing the burst write cycle handshaking.

The processor clock ck_clk on line 116 is input to the BIU and SDC. The SDC and BIU are synchronized to this clock. The SDC asserts the sdc ready signal on line 120 when the SDC is ready to receive a transaction from the BIU. The BIU outputs a transaction to the SDC by asserting a command online 118, an address on line 68 and the biu data valid signal on line 122.

The SDC stores the command and address in its input buffer on the next clock cycle 210 and de-asserts sdc_ready. The BIU outputs data beat 1 on the sdc_biu_data pins 70 in the next clock cycle 212. The SDC stores data beat 1 in its input buffer in clock cycle 212. Since this is a burst write, the BIU outputs data beats 2, 3 and 4 in consecutive clock cycles 214, 216 and 218 respectively. The SDC also stores data beats 2, 3 and 4 in its input buffer in clock cycles 214, 216 and 218.

A partial burst write stores a designated portion of a data beat in the SDRAM. In particular a PCI bus master, via the BIU, can initiate a partial burst write to the main memory. In that case, the PCI bus master, and therefore the BIU, also sends byte enables with every valid data byte of every valid beat. For example, for eight bytes of valid data in a beat, the BIU sends eight byte enables. The SDC outputs byte enables to the SDRAM on the dqm pins. In other words, the dqm signals are asserted for the bytes which are supposed to be written to the SDRAM.

The starting address of a burst or partial burst write transaction is on a cache line boundary. In this embodiment, a cache line is thirty-two bytes.

A read begin transaction is similar to the write begin transaction except that the read begin does not send data bytes.

The SDC command queue can store up to four transactions. Once the SDC command queue is full, the SDC deasserts the sdc ready signal 120 until one of the transactions in the command queue completes. The sdc ready signal 120 signal is also deasserted while the SDC is receiving data for burst write transactions from the BIU.

For write transactions, the SDC does not consider the memory write transaction as completed until the SDC writes the data to the SDRAM memory.

Read End

Figure 7:
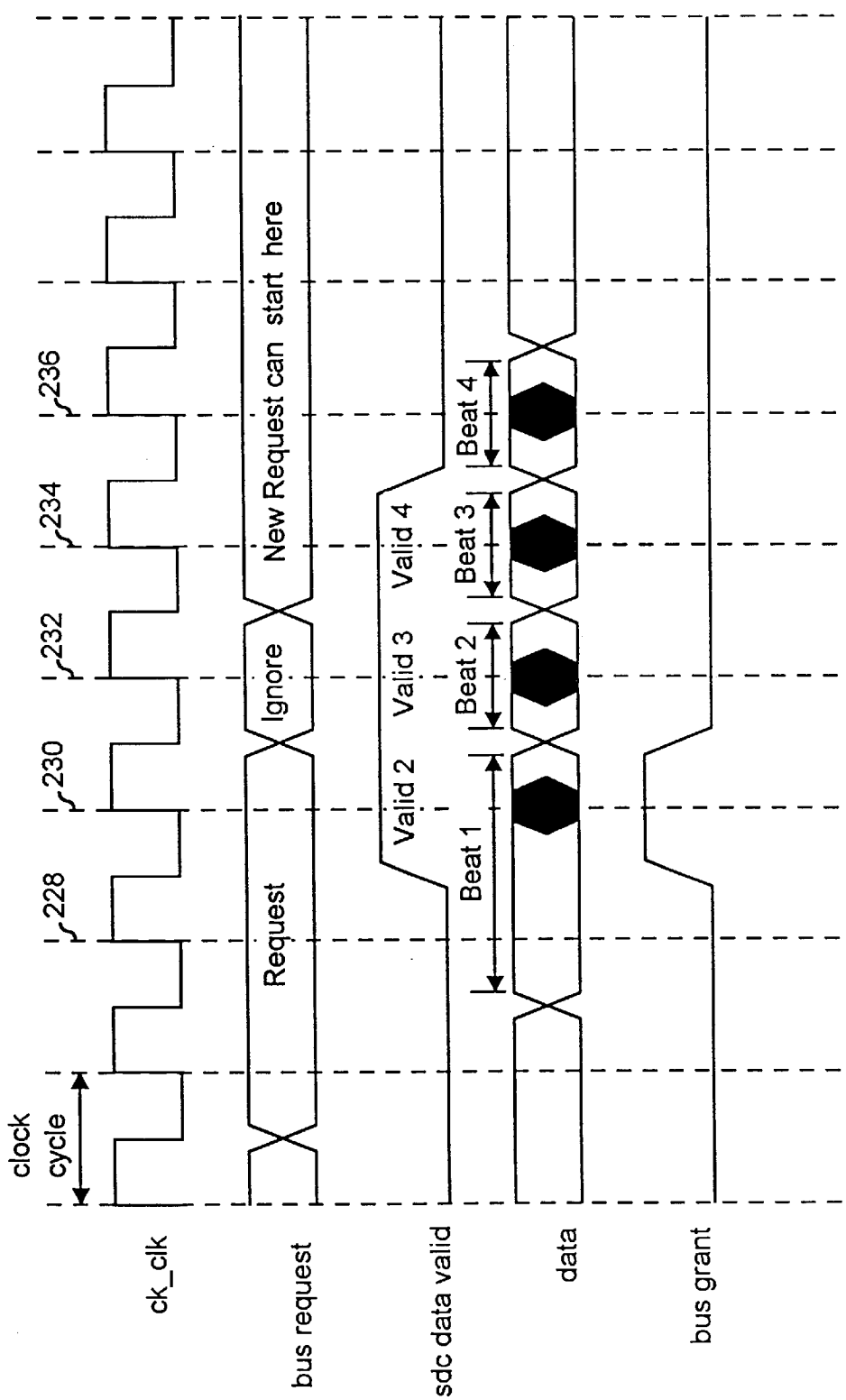
FIG. 7 is a timing diagram of a "read end" transaction to send data from the SDC to the BIU.

FIG. 7 is a timing diagram of a "read end" transaction that sends data from the SDC to the BIU. In response to a read begin transaction from the BIU, the SDC initiates the read end transaction to return the data to the BIU. As in FIG. 6, the transaction is synchronized to the processor clock ck_clk on line 116.

The SDC asserts the bus request signal on line 128 when the data return unit is ready to send data. When ready to receive data from the SDC, the BIU asserts the bus grant signal on line 130.

In the next cycle 230 following bus grant 130, the SDC outputs the first beat of the data, Beat 1, on the data bus 70. Prior to clock cycle 230, the sdc asserts the sdc data valid signal one line 132 to indicate that another data beat, Beat 2, will be output after Beat 1 at the start of clock cycle 230. The black region of the data signal 70 indicates that the data signals are held at the desired level at that time. On the positive edge of clock cycle 230, the BIU accepts the first data beat, Beat 1. The SDC continues to assert the sdc data valid signal on line 132 for two more clock cycles 232, 234 for the BIU to receive data beats 3 and 4.

Single Beat Read and Write Transactions

For a single beat read, the SDC returns only one data beat during the read end transaction. For a single beat write, the SDC writes only one data beat. The SDC can access the SDRAM memory using single beat transactions. However, in a preferred embodiment, to reduce the complexity of the SDC, when a single beat read transaction is requested, the SDC actually performs a burst read with the SDRAM but returns a single data beat.

SDC register reads and writes are single beat transactions. The SDC register read and write accesses are also sixty-four bit accesses. The command fifo of the command queue receives a read begin or a write begin transaction from the BIU that has an address in the register address space. The SDC decodes that address and selects the desired register for the read or write operation. If the register access transaction is first in the command queue, the SDC starts processing that transaction immediately. If the register access transaction is not first in the command queue, the SDC performs the register access transaction when the register access transaction comes to the head of the command queue.

The SDC does not pipeline transactions over an existing register transaction. The SDC waits for the register transaction to complete before executing the next transaction.

Pipelining SDRAM Accesses

The SDC pipelines or overlaps certain types of SDRAM accesses to more efficiently access and use the data bus of the SDRAM.

Read and write accesses between the SDC and the SDRAM have two phases: an activate phase followed by a command phase. In the activate phase, the SDC outputs an activate command to precharge the desired internal SDRAM bank. In the command phase, the SDC outputs either a read or write command to the SDRAM.

For a write access, the SDC outputs the "activate" command followed by the "write with auto-precharge." Along with the "write with auto-precharge" command, the SDC outputs the first beat of the "write data."

For a typical read access, the SDC outputs the "activate" command followed by the "read with auto-precharge" command. After outputting the "read with auto-precharge" command, and after the Tcl (CAS latency) has expired, the SDC receives the "read data" from the SDRAM and stores the "read data" in the data return fifo.

The SDC pipelines or overlaps certain consecutive SDRAM accesses under certain conditions. Table 4 below summarizes the accesses that are pipelined.

TABLE 4

| 1st Access | 2nd Access | To which internal bank | To which rank | Pipeline 2nd Access Command Phase over 1st Access? | Pipeline 2nd Access Activate Phase over the 1st Access? |
|---|---|---|---|---|---|
| Read | Read | Same | Same | No | No |
| | Read | Same | Different | Yes | I$^a$ |
| | Read | Different | X$^b$ | Yes | I |
| | Write | Same | Same | No | No |
| | Write | Same | Different | No | Yes |
| | Write | Different | X | No | Yes |
| Write | Read | Same | Same | No | No |
| | Read | Same | Different | Yes | I |
| | Read | Different | X | Yes | I |
| | Write | Same | Same | No | No |
| | Write | Same | Different | No | Yes |
| | Write | Different | X | No | Yes |

I$^a$ - implied by the previous column
X - Don't Care

In Table 4, for a first read access to a first internal bank, a second read access to a different internal bank will always pipeline both the activate and the command phases. However, a read access to a first internal bank followed by a write access to the same internal bank address but in a different rank, will pipeline the activate phase of the write access over the read access. The command phase of the write access will not be pipelined over the read access.

Figure 8:
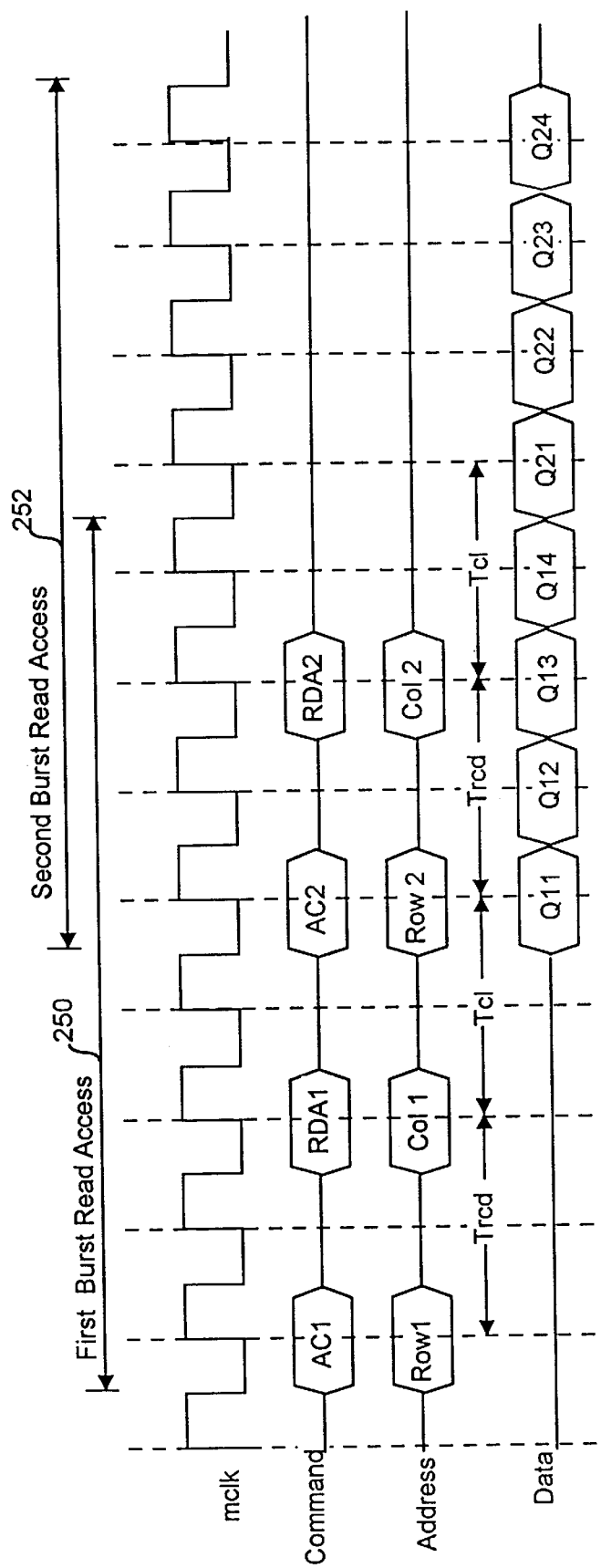
FIG. 8 is a timing diagram showing pipelining of command, address, and data signals for consecutive burst read SDRAM accesses.

FIG. 8 is an exemplary timing diagram showing pipelining of two consecutive burst read transactions. Each burst read transaction accesses a different internal bank of an SDRAM. FIG. 8 shows various signals: mclk command, address and data. The command signals are the control signals on lines 140–152 of FIG. 3, and use the SDC command encoding of FIG. 4.

The mclk signal is the memory clock that is programmed via the SDC configuration register described above. The command, address and data signals are synchronized to the memory clock.

Before starting the read access, the SDC was programmed at power up. A predetermined value of Trcd was loaded into the timing/control register of the SDC. As described above, Trcd is the number of memory clock cycles from an SDRAM activate command until an SDRAM read/write command. Tcl was also loaded into the SDC memory mode register. Trcd, the number of memory clock cycles from an SDRAM activate command until an SDRAM read/write command, was also loaded. In FIG. 8, Trcd is two (2) memory clock cycles and Tcl is also two (2) memory clock cycles.

In FIG. 8, to initiate the first burst read access, the memory sequencer 110 outputs a first activate command (AC1) with the row address (Row1) to the SDRAM. The memory sequencer 110 then outputs the Read Data Command (RDA1) and the column address (Col1) for the first read access such that RDA1 and Col1 will be valid within Trcd memory clock cycles after issuing the activate command, AC1. The memory sequencer outputs the second activate command (AC2) and the second row address (Row2) for the second burst read access such that AC2 and Row2 will be valid within Tcl memory clock cycles after outputting the read command, RDA1. In the same memory clock cycle that the AC2 command is output to the SDRAM, the SDRAM outputs the first beat of "read data" Q11 for the first burst read access.

In other words, the first burst read access completes in a predetermined number of clock cycles 250. The second burst read access also takes the same number of clock cycles to complete 252. The SDC of the present invention outputs the second read access 252 before the first read access 250 completes. Therefore, the SDC increases the speed of consecutive SDRAM accesses and improves the efficiency of using the SDRAM data bus.

Figure 9:
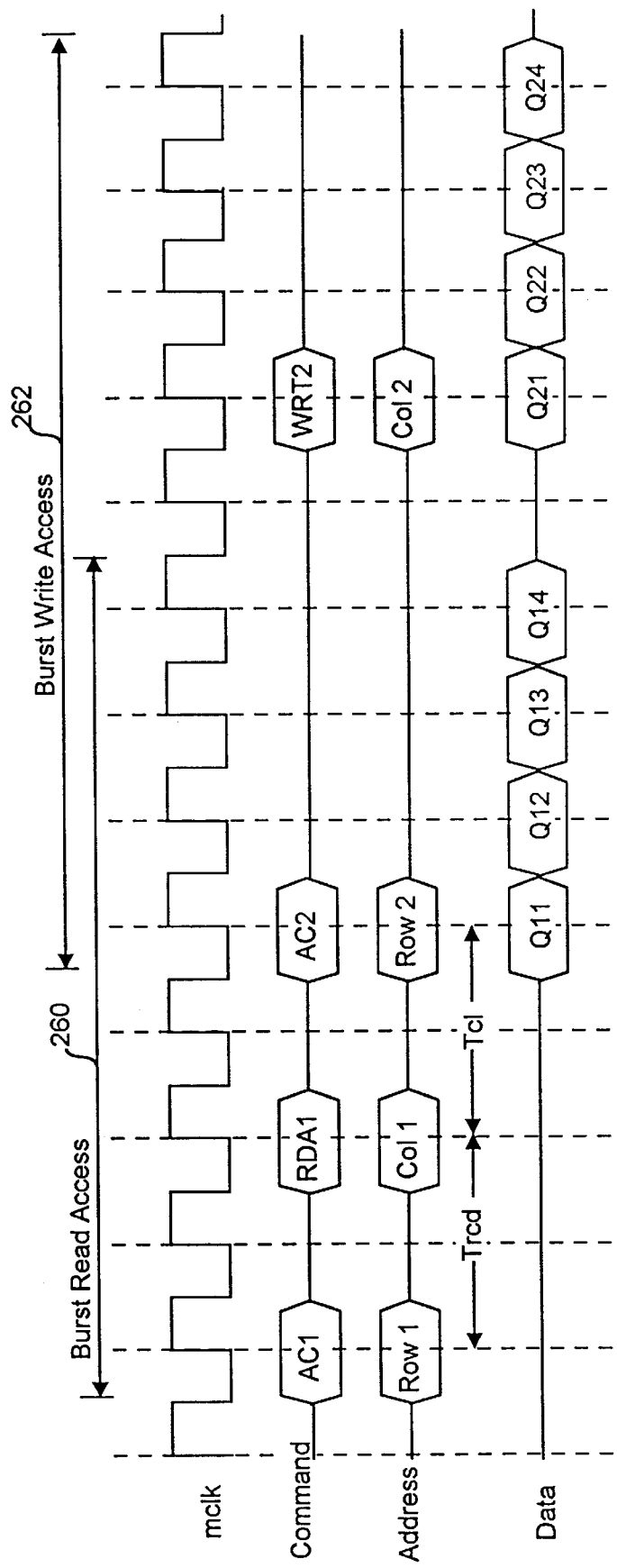
FIG. 9 is a timing diagram showing pipelining of command, address and data signals for a burst read followed by a burst write SDRAM access.

FIG. 9 is an exemplary timing diagram showing pipelining of a burst read access 260 followed by a burst write access 262. The burst read access 260 accesses a different internal bank of an SDRAM from the burst write access 262. FIG. 9 shows the same signals as FIG. 8: mclk, command, address and data. The command signals differ from the command signals of FIG. 8 because the second SDRAM access is a burst write.

The SDC outputs a burst read access as described above for FIG. 8 and the burst read access 260 completes in a certain number of clock cycles. Before the burst read access 260 is complete, the memory sequencer 110 initiates a burst write access 262.

Similar to the second burst read access of FIG. 8, for the burst write access, the memory sequencer 110 outputs an activate command (AC2) with the row address (Row2) to the SDRAM. However, unlike FIG. 8, the memory sequencer outputs the write command (WRT2), the column address (Col2), and the first data beat Q21 to write to the SDRAM after the last data beat Q14 of the "read data" has been read from the SDRAM. Therefore, the SDRAM and SDC avoid driving the data bus at the same time.

Interleaved Access

Figure 10:
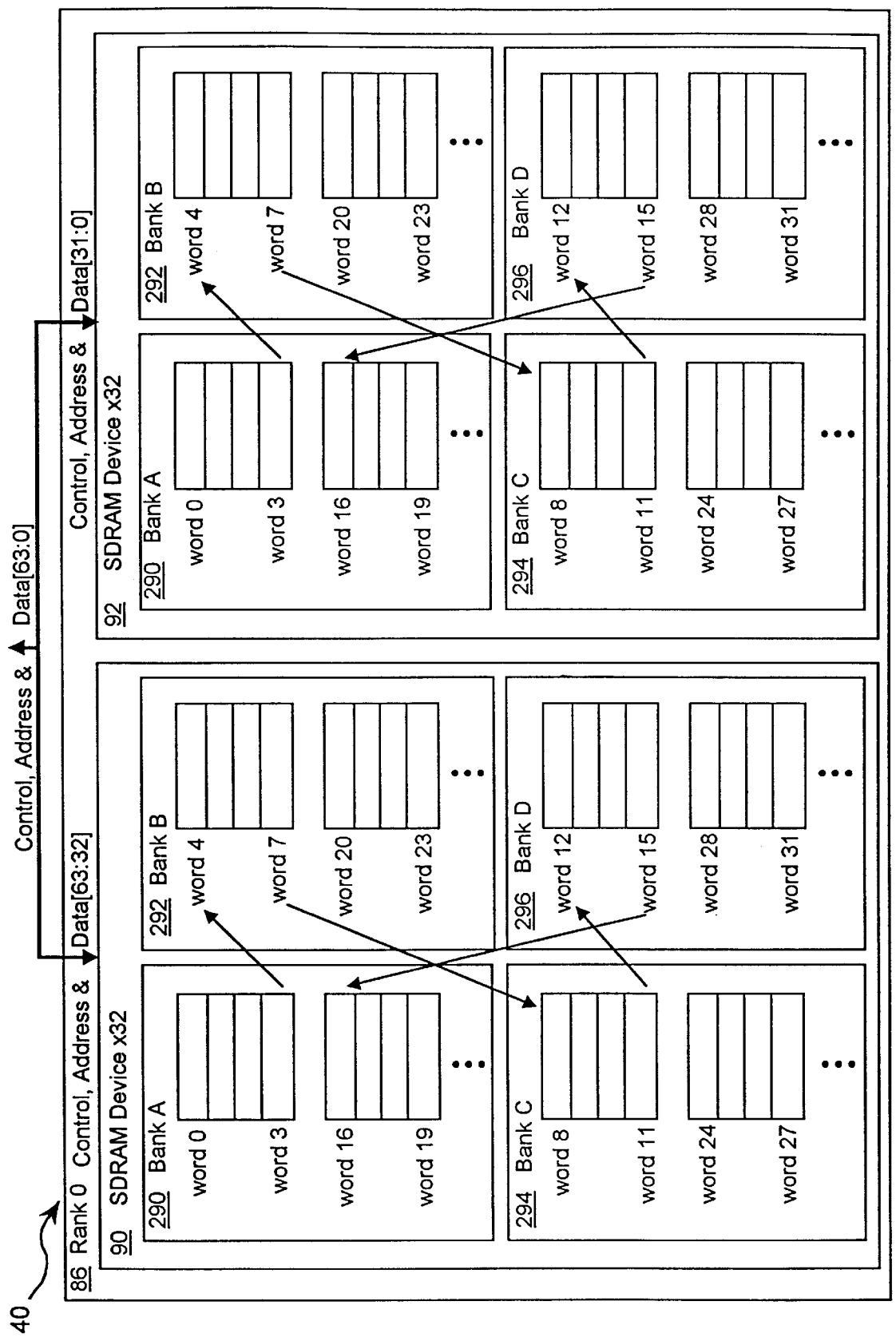
FIG. 10 shows an exemplary SDRAM configuration for interleaved access in a preferred embodiment of the present invention.

FIG. 10 shows an exemplary configuration of one rank of an SDRAM array 40 for interleaved access in a preferred embodiment of the present invention. The rank 86 has two SDRAM devices 90 and 92. SDRAM devices 90, 92 have four internal banks 290, 292, 294, 296. Each internal bank stores words. Data from a single cache line of the command queue is stored in a word. The words are organized to match the command queue. In other words, for a burst transaction with four consecutive data beats, the four data beats will be stored to or read from consecutive memory locations, such as word 0 to word 3, in the same internal bank of the SDRAM.

In a preferred embodiment, alternate cache-lines are stored in different internal banks. If the data is sequential, then maximum performance is achieved by pipelining accesses between the different internal banks.

Address Multiplexing

The memory sequencer 110 performs the address multiplexing function. Memory interleaving is done using the lower order address bits (address bits 5 and 6). In other words, BIU-SDC address bits 5 and 6 are used to control the bank select inputs of the SDRAM devices of the SDRAM array 40.

In addition, at power on reset, the SDC is programmed to multiplex the row and column bits during various SDRAM commands by specifying the size of the rank in the Base Address Registers.

The SDC outputs the multiplexed row and column addresses to the SDRAM array 40 on the SDRAM address bus 80. The row and column addresses that are output on the SDRAM address bus are derived from the BIU-SDC address bus as shown in Table 5 below.

In Table 5, RSIZ is the size of the rank, and MA are the SDRAM memory address bits. RSIZ is loaded into the Base Address Register 0. In Table 5 RSIZ has been programmed with "000", which corresponds to a rank size of 16 Mbytes using a 64 Mbit×32 SDRAM device.

The BADDR field contains the high order bits (24–31) of the rank base address to which the associated command strobe CS responds. The value stored in the BADDR field must be a multiple of the corresponding rank size.

MA12 and MA13 are the SDRAM internal bank selects and are mapped to A5 and A6 respectively.

TABLE 5

| MA | RSIZ 000[a] Row | Col | 000[b] Row | Col | 000[c] Row | Col | 000[d] Row | Col | 000[e] Row | Col |
|---|---|---|---|---|---|---|---|---|---|---|
| MA13 | A6 | | A6 | | A6 | | A6 | | A6 | |
| MA12 | A5 | | A5 | | A5 | | A5 | | A5 | |
| MA11 | A23 | | A24 | | A25 | | A26 | A15 | A27 | A15 |
| MA10 | A22 | H | A23 | H | A24 | H | A25 | H | A26 | H |
| MA9 | A21 | | A22 | | A23 | | A24 | A14 | A25 | A14 |
| MA8 | A20 | | A21 | | A22 | A13 | A23 | A13 | A24 | A13 |
| MA7 | A19 | | A20 | A12 | A21 | A12 | A22 | A12 | A23 | A12 |

TABLE 5-continued

| MA | RSIZ 000[a] Row | Col | 000[b] Row | Col | 000[c] Row | Col | 000[d] Row | Col | 000[e] Row | Col |
|---|---|---|---|---|---|---|---|---|---|---|
| MA6 | A18 | A11 | A19 | A11 | A20 | A11 | A21 | A11 | A22 | A11 |
| MA5 | A17 | A10 | A18 | A10 | A19 | A10 | A20 | A10 | A21 | A10 |
| MA4 | A16 | A9  | A17 | A9  | A18 | A9  | A19 | A9  | A20 | A9  |
| MA3 | A15 | A8  | A16 | A8  | A17 | A8  | A18 | A8  | A19 | A8  |
| MA2 | A14 | A7  | A15 | A7  | A16 | A7  | A17 | A7  | A18 | A7  |
| MA1 | A13 | A4  | A14 | A4  | A15 | A4  | A16 | A4  | A17 | A4  |
| MA0 | A12 | A3  | A13 | A3  | A14 | A3  | A15 | A3  | A16 | A3  |

[a]Rank Select = A[24]
[b]Rank Select = A[25]
[c]Rank Select = A[26]
[d]Rank Select = A[27]
[e]Rank Select = A[28]
[f]MA[12:13] = Internal Bank Selects, that is A5 and A6 are connected to the SDRAM internal Bank Selects
[g]Read/Write with auto precharge command encoding requires A10 to be driven high The address multiplexing scheme shown in Table 5 works by pipelining SDRAM accesses across different internal banks of the SDRAM. This scheme is efficient if most of the data written to the SDRAM is sequential so that consecutive accesses are stored in the same rank but in different internal banks. In addition, this exemplary address multiplexing scheme assumes that both of the SDRAM ranks are the same size, both ranks use the same size SDRAM devices, the SDRAM devices have four internal banks, and all ranks start on a block size boundary.

In alternate embodiments, multiple ranks are used, and the SDRAM devices have two or more (N) internal banks.

Referring back to FIG. 10, an example of interleaving will be described. Even though the memory access will read data from both SDRAMS, the operation of a single SDRAM device 90 will be described. This description applies to both SDRAM devices 90, 92.

Assume that one of the devices on the system bus initiates a large number of read begin transactions such that all the data stored on the SDRAM device 90 will be read. Also assume that the first SDRAM access is to Rank 0, Bank A, word 0, and that the burst length is four data beats.

In FIG. 10, the arrows show the pattern of accessing sequential data stored in the different internal banks. This SDRAM configuration and data organization takes advantage of pipelining burst reads to access sequential data as shown in the timing diagram of FIG. 8.

For the first burst read, the SDC accesses the four data beats that are stored consecutively in words 0 through 3 of Bank A 290 of SDRAM device 90. The SDRAMs are organized such that words 4 through 7 are stored in internal bank B 292 of the SDRAM device 90. Since the next four data beats are stored in a different internal bank 292, the SDC pipelines the second burst read that requests words 4–7 over the first burst read (also shown in FIG. 6). Similarly, words 8 through 11 are stored in internal bank C 294; therefore, the SDC pipelines the third burst read over the second burst read. Words 12 through 15 are stored in internal bank D 296; therefore, the SDC pipelines the fourth burst read over the third burst read. Words 16–19 are stored in internal bank A 290; therefore, the SDC pipelines the fifth burst read over the fourth burst read.

A More Detailed Block Diagram of the SDC

Figure 11:
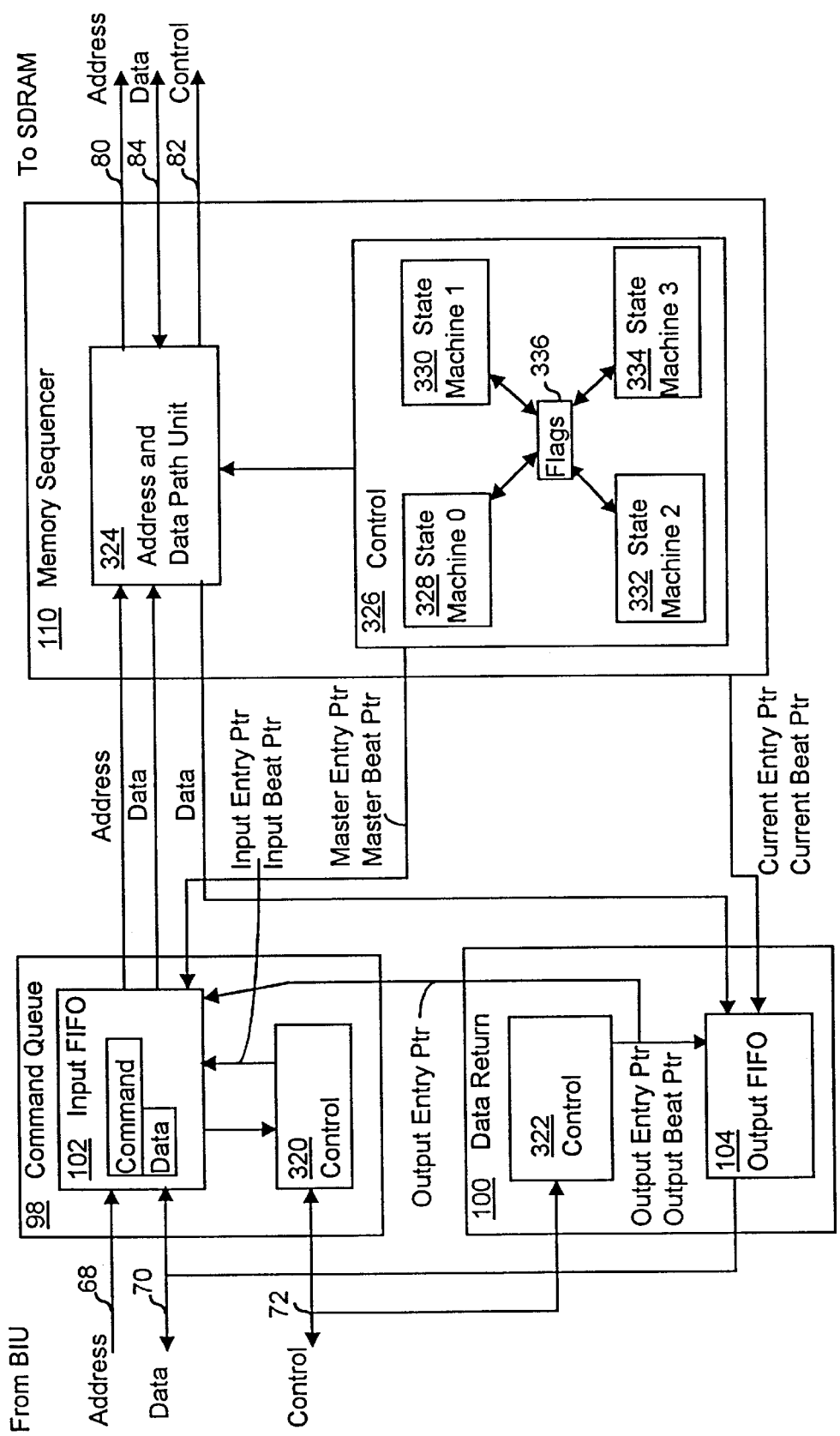
FIG. 11 is a detailed block diagram of the SDC command queue, data return unit and memory sequencer.

FIG. 11 is a more detailed block diagram of the SDC showing the interaction between the command queue 98, data return unit 100 and memory sequencer 110. The command queue 98 has an input fifo 102 and a control unit 320. Similarly the data return unit 100 has an output fifo 104 and a control unit 322. The memory sequencer 110 has an address-and-data-path unit (path unit) 324 and a control unit 326. The path unit 324 connects to the SDRAM array and outputs the address on bus 80, control signals on bus 82 and data signals on bus 84 to the SDRAM array in response to the memory sequencer control unit 326.

Various pointers are used by the command queue 98, data return unit 100 and memory sequencer 110 to control the flow of information into and out of the input fifo 102 and output fifo 104.

In the command queue 98, the control unit 320 has a state machine that controls the flow of transactions from the BIU into the input fifo 102 using an input entry pointer and an input beat pointer.

Within the data return unit 100, the control unit 322 has a state machine that controls the flow of data from the output fifo 104 to the BIU using an output entry pointer and an output beat pointer.

The control unit 326 of the memory sequencer 110 controls the flow of transactions and data from the input fifo 102 using a master entry pointer that points to the next entry to be loaded into one of the state machine registers of the memory sequencer 110. The master entry pointer has an associated master beat pointer that points to a data beat that will be output to the SDRAM during a write operation. A current entry pointer and a current beat pointer connect to the output FIFO 104 and point to the entry and data beat that store the data output from the SDRAM during a read operation.

The control unit 326 of the memory sequencer 110 has four state machines State Machine 0 328, State Machine 1 330, State Machine 2 332 and State Machine 3 334. Each state machine is dedicated to transactions for a specific internal bank of the SDRAM. For example, State Machine 0 (STM0) 328 is dedicated to internal bank 0, State Machine 1 (STM1) 330 is dedicated to internal bank 1, State Machine 2 (STM2) 332 is dedicated to internal bank 2, and State Machine 3 (STM3) 334 is dedicated to internal bank 3. Each state machine has a current entry state machine entry pointer and a current state machine beat pointer. The state machines STM 0-STM 3 328–334 coordinate or synchronize SDRAM memory accesses using the flags 336, the current state machine beat pointer, the current state machine entry pointer and the valid bits.

The output entry pointer of the data return unit 100 connects to the input FIFO 102 to output the initiator of the transaction and the transaction type to the BIU from the command portion of the input FIFO 102.

SDC Schematics
Command Queue

Figure 12A:
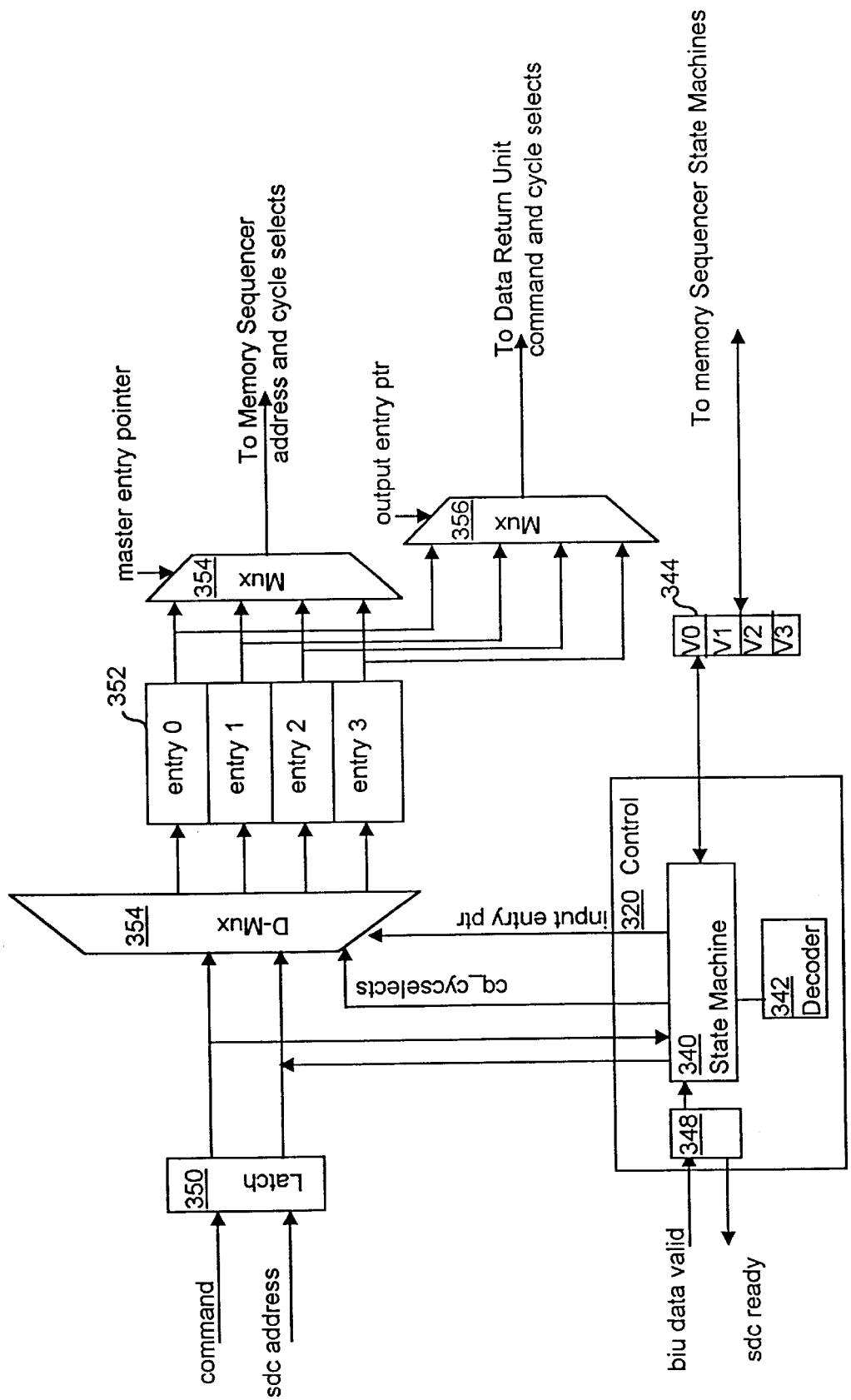
FIG. 12A is a circuit diagram showing an exemplary implementation of the address and attribute path of the input fifo of the command queue.
Figure 12B:
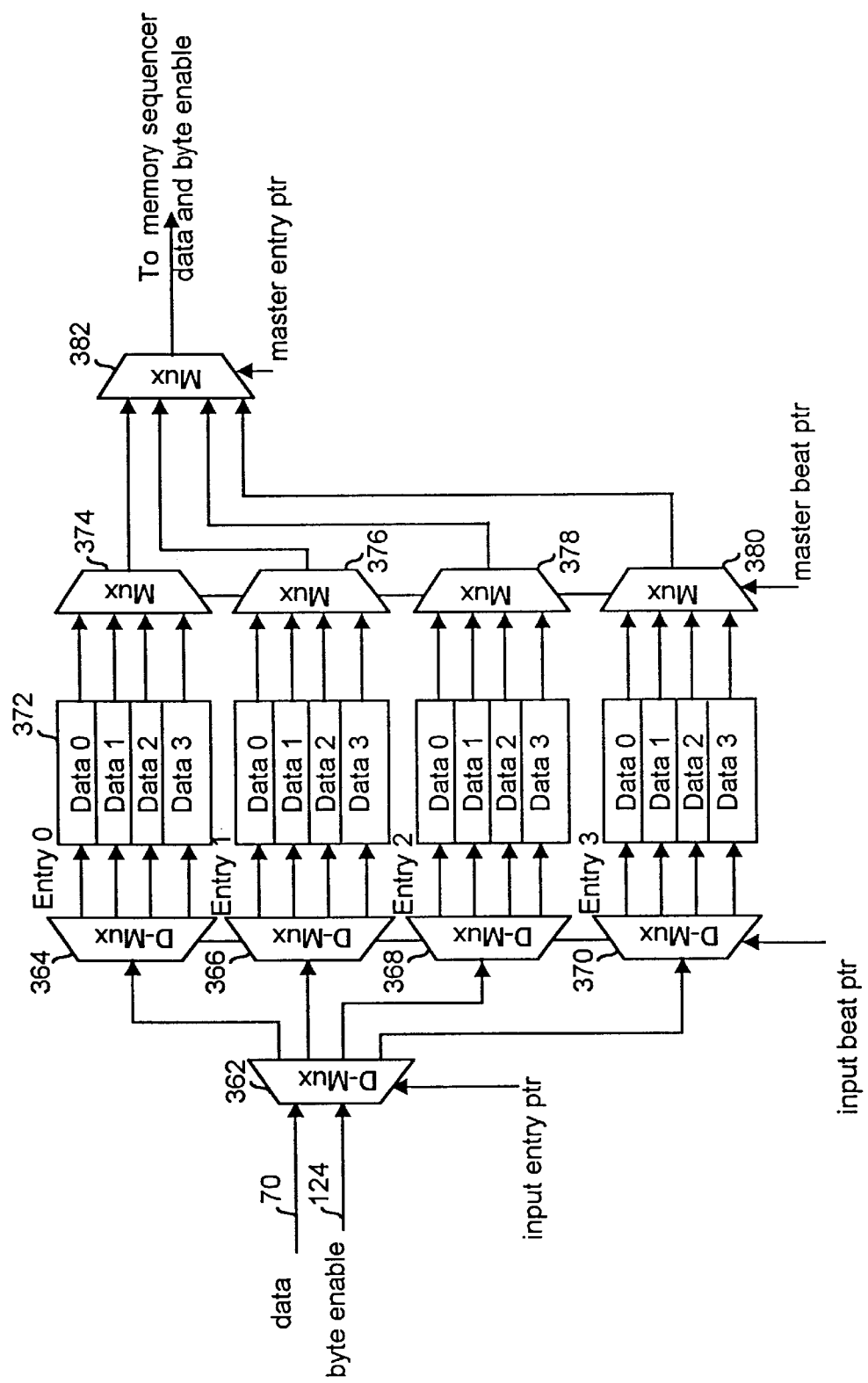
FIG. 12B is a circuit diagram showing an exemplary implementation of the data and byte enable path of the input fifo of the command queue.

FIGS. 12A and 12B are detailed block diagrams of the command queue 98. FIG. 12A depicts the command queue input fifo's address and attribute path (address path). FIG. 12B depicts the command queue input fifo's data and byte enable path. The control unit 320 controls both the address path and the data path of the command queue input fifo 102.

Command Queue Control Unit

The control unit 320 has state machine 340, a decoder 342, and begin-ready handshaking logic 348. The decoder 342 decodes commands to generate the cycle selects which are stored with the address and command in the input fifo.

Referring also to FIG. 3B, the cycle selects are:
RR—register read
RW—register write
MR—memory read
MB—memory burst write
MS—memory non-burst write
CW—Critical Word First The begin-ready generation logic 348 generates the handshaking signals described in the timing diagram for FIG. 6, and operates in conjunction with the command queue state machine 340.

The command input fifo has a latch 350 to store the command and address information, an input buffer 352 with entries 0 through N, a demultiplexor (D-mux) 354 to control the flow of information into the input buffer 352, a multiplexor (Mux) 354 to control the flow of information from the input buffer 352 to the memory sequencer 110, and a multiplexor (Mux) 356 to control the flow of information from the input buffer 352 to the SDC registers. The buffer 352 is implemented as a set of registers.

Referring to both FIGS. 11 and 12A, on the input side of the command fifo, the D-mux 354 uses the input entry pointer to store the address, command and cycle select information in the appropriate entry.

The command queue state machine 340 outputs a control signal that stores the command and address information in the latch 350. A register in the state machine 340 outputs the input entry pointer. The state machine 340 increments the input entry pointer each time there is a valid command on the BIU-SDC bus. The command queue state machine 340 also sets the valid field (V bit) in the input fifo 102 when a valid transaction is identified.

Command Queue: Data and Byte Enable Path

The command queue control block 320 of FIG. 12A also controls the data and byte enable path of the command queue of FIG. 12B.

The data portion of the input fifo has a D-mux 362. The data bus 70 and byte enables 124 connect to the inputs of the D-mux 362. Each output of the D-mux 362 connects to another D-mux 364, 366, 368 and 370. The input entry pointer is input to D-mux 362 to place the data and byte enables in the appropriate entry buffer 372. The input beat pointer controls D-mux's 364, 366, 368 and 370 to place the data and byte enables in the appropriate data beat (Data 0, Data 1, Data 2, Data 3) of the appropriate entry buffer 372.

Each data beat of the entry buffers 372 connects to one of the multiplexers 374, 376, 378, 380. The master beat pointer from the memory sequencer controls the multiplexers 374, 376, 378, 380 to select the appropriate data beat and byte enable to output to the SDRAM. Each multiplexor 374, 376, 378, 380 connects to multiplexor 382 which is controlled by the master entry pointer from the memory sequencer to select the appropriate data entry of the data beats to output to the SDRAM. The master entry pointer also connects to a multiplexor to select the address and command to load into the memory sequencer state machine registers.

For write transactions, the memory sequencer outputs data to the SDRAM. The master entry pointer and master beat pointer are used to control the flow of data from the input fifo 102 to the SDRAM via the data path unit of the memory sequencer.

Each entry 352, entry 0 to entry 3, has a corresponding valid bit 344, V0 to V3, respectively. The state machine 340 sets the valid bits V0 to V3. The state machine 340 sets a valid bit for an entry when that entry stores a command and all associated data. The memory sequencer state machines reset the valid bit after the execution of certain commands is completed. In particular, the memory sequencer state machines reset the valid bit for an entry for a write operation after the last data beat has been output to the SDRAM. For a read opereration, the state machine of the data return unit resets the valid bit for an entry of the command queue after the last data beat for that read operation has been output to the BIU.

The Data Return Unit

Figure 13:
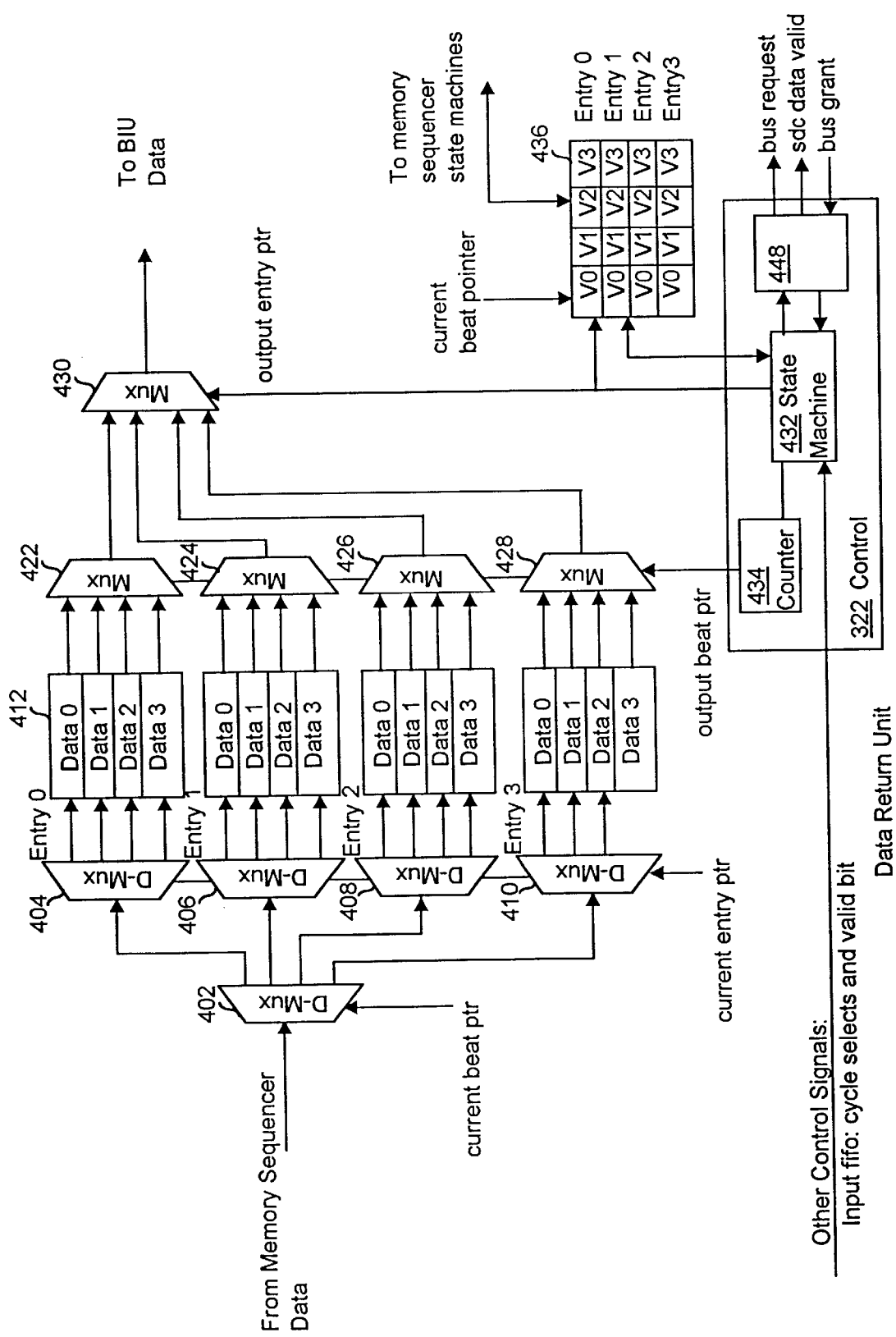
FIG. 13 is a circuit diagram showing an exemplary implementation of the data return unit.

FIG. 13 is a schematic of the data return unit 100 to send data from the SDRAM to the BIU for read transactions. The data return unit 100 operates in a manner similar to the command queue except that it operates in the opposite direction—to send data from the SDC to the BIU.

The data return unit has a control unit 322 and a fifo 104. Like the command queue, the fifo 104 has D-mux's 402, 404, 406, 408, 410, and a buffer 412 with four entry registers. Each entry register stores up to four data beats. The fifo 104 also has multiplexers 422, 424, 426, 428, 430.

The D-mux 402 receives data from the SDRAM via the memory sequencer 110. The current beat pointer connects to D-mux 402 to direct the data beat to the appropriate entry of the output buffer 412. D-mux's 404, 406, 408, 410 are controlled by the current entry pointer to direct the data beat to the appropriate location within an entry of the appropriate output buffer 412.

The control unit 322 has a state machine 432 and output beat counter 434 to generate and output the output beat pointer and output entry pointer to the output fifo 104 to control the flow of data the BIU-SDC data bus.

The control unit 322 also has handshaking logic 448 that works in conjunction with the state machine 432 to handle the handshaking signals with the BIU to transfer the data onto the data bus for a read end transaction as described above in the timing diagram for FIG. 7. The state machine 432 also controls and increments the output beat pointer and output entry pointer.

The output entry pointer is used to synchronize the operation of the data return unit with the command queue 98. The output entry pointer points to the "read begin" entry of the command queue fifo 102 to provide the data return control unit 322 with the control information related to the data being returned such as the initiator and the type of transaction.

The data return unit state machine 432 resets the valid bits 436. In the data return unit, each data beat of each entry has a valid bit, V0 to V3, that is stored in a flip-flop or register. The memory sequencer state machines set a valid bit 436 after a data beat is stored in the one of entries of the FIFO 412. The data return unit state machine 432 resets a valid bit for a data beat after driving that data beat onto the data bus.

State Diagrams

Figure 14:
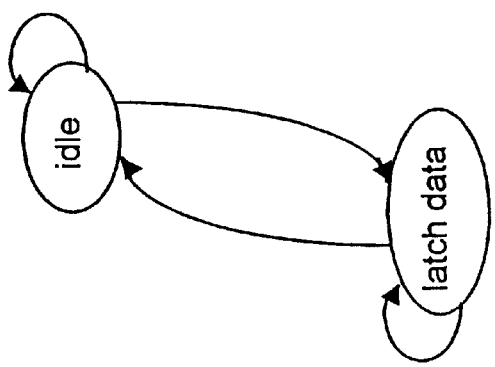
FIG. 14 is an exemplary state diagram for a state machine of the command queue.

FIG. 14 is a state diagram that depicts the overall operation of the command queue state machine 340 of FIG. 12A.

Table 6 describes the state transitions for the state diagram of the command queue state machine of FIG. 14. For the state diagram, the input entry pointer always points to the entry that will store the incoming command and/or data.

TABLE 6

| Current State | Conditions and Actions | Next State |
|---|---|---|
| idle | If read transaction, set valid bit for the entry and increment input entry pointer | idle |
|  | If write transaction (register or memory burst write) and biu data valid signal is asserted | latch data |
| latch data | If biu data valid signal is asserted and the transaction is a burst write, latch data beat 0 (store the data beat in the input fifo), and increment the input beat pointer. | latch data |
|  | If biu data valid signal is asserted, latch the data beat, and increment the input beat pointer. | latch data |
|  | If all four beats latched or register write transaction, set the valid bit for the entry, and increment the input entry pointer. | idle |

Figure 15:
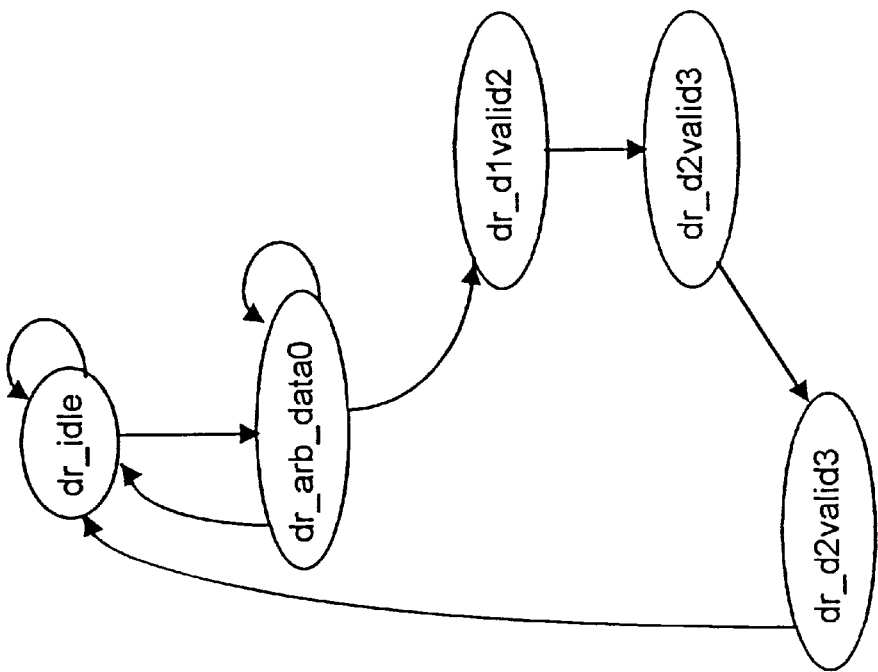
FIG. 15 is an exemplary state diagram for a state machine of the data return unit.

FIG. 15 is a state diagram that depicts the overall operation of the data return unit state machine 432 of FIG. 13. Table 7 describes the state transitions for the state diagram of the command queue state machine of FIG. 15. Initially, the output entry pointer and output beat pointer point to data beat 0 of entry 0.

TABLE 7

| Current State | Conditions and Actions | Next State |
|---|---|---|
| dr_idle | If write transaction, increment output entry pointer to point to the next entry in the command and data return FIFOs. | dr_idle |
|  | If read transaction and if data ready, or if register read transaction and regready (an internal signal). | dr_arb_data0 |
| dr_arb_data0 | If valid bit for data beat 0 of entry pointed to by the output entry pointer is set, assert bus request signal and drive data beat 0 onto the data bus. If non-cachable read, drive data beat zero. Clear the Valid bit for data beat 0. | dr_idle |
|  | If bus grant signal asserted and if data beat 1 is ready, assert sdc data valid signal to the BIU for data beat 1. | dr_d1_valid2 |
| dr_d1valid2 | If the valid bit for data beat 2 for the entry is set, assert SDC valid signal to the BIU for data beat 2, drive data beat 1 onto the data bus. Clear the Valid bit for data beat 1. | dr_d2valid3 |
| dr_d2valid3 | If the valid bit for data beat 3 for the entry is set, assert SDC valid signal to the BIU for data beat 3, drive data beat 2 onto the data bus. Clear the Valid bit for data beat 2. | dr_data3 |
| dr_data3 | If the valid bit for data beat 3 of the entry is set, drive data beat 3 onto the data bus. Clear the Valid bit for data beat 3. Clear the Valid bit in the input fifo (102) for entry pointed to by the output entry pointer. Increment the output entry pointer to point to the next entry in the Command and Data Return FIFOs. | dr_idle |

Memory Sequencer

Figure 16A:
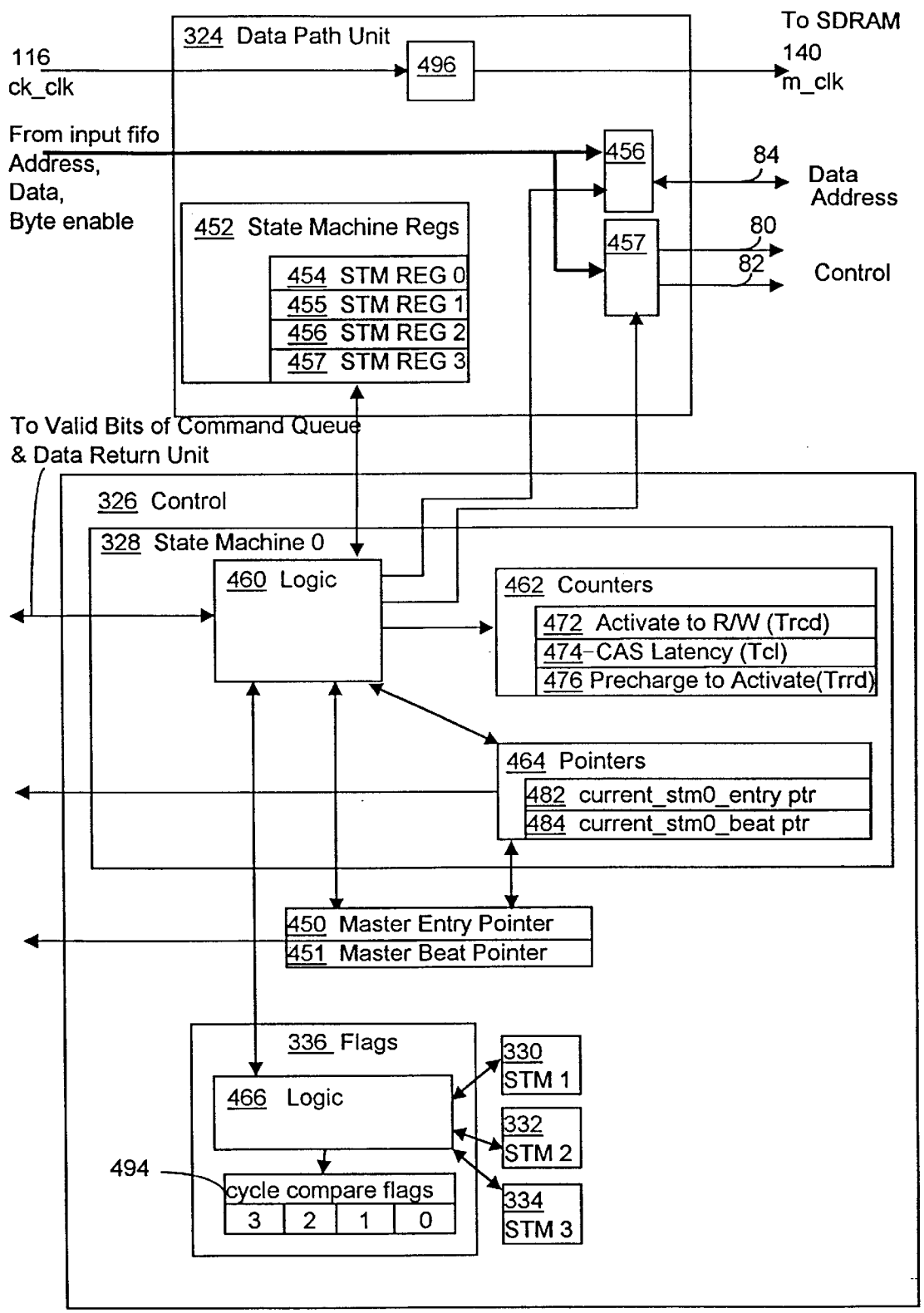
FIG. 16A is a detailed block diagram of the memory sequencer.

FIG. 16A is a detailed block diagram of the memory sequencer 110 with its Datapath 324 and Control 326 unit. The Control unit 326 has the four state machines 328, 330, 332, 334 as described above. The state machines are the same; therefore this diagram shows the details of one state machine, STM0 328. In addition, the control unit 326 has the cycle compare flags 336, a master entry pointer register 450 and a master beat pointer register 451 which are shared by all state machines 328, 330, 332, 334.

Each state machine is dedicated to an internal bank of an SDRAM irrespective of rank. Therefore, state machine STM0 328 is dedicated to internal bank 0 of ranks 0 and 1.

In an alternate embodiment, additional state machines are dedicated to internal banks in different ranks to allow for pipelining of memory accesses over different ranks. For example, STM0 would be dedicated to internal bank 0 in rank 0, while another state machine would be dedicated to internal bank 0 in rank 1.

In addition, this invention is not meant to be limited to four state machines, alternately, any number (n) of state machines can be used.

The memory sequencer 110 controls the pipelining of the SDRAM accesses. The control unit 326 of the memory sequencer 110 removes incoming transactions from the input fifo 102 of the command queue, schedules these transactions for output to the SDRAM, translates the transactions, generates the appropriate SDRAM commands and outputs the SDRAM commands.

The memory sequencer's data path unit 324 has a state machine registers 452 for each state machine, and ports 456, 457 to output the data, control and address signals to the SDRAM. Port 456 is a buffer that is stores the data beats for an entry.

In an alternate embodiment, the buffer is stores data beats for multiple entries. The state machine registers are STM REG 0 454, STM REG 1 455, STM REG 2 456 and STM REG 3 457.

FIG. 16B shows an exemplary state machine register 452. The state machine register 452 stores the address and cycle select bits for the state machine.

Referring back to FIG. 16A, in particular state machine register STM REG0 454 stores the address and cycle select bits for state machine 0 328.

State Machine 0 328 has a logic block 460, three counters 462 and pointers 464. The logic block 460 controls the counters 460, pointers 464 and the master entry and beat pointers, 450 and 451 respectively. The logic block 460 also connects to the logic block 466 of the flags 336. The counters 460 include an activate to R/W counter (Trcd) 472, a CAS latency counter (Tcl) 474 and a Precharge to Activate counter 476. The logic block 460 supplies the control signals to port 457 to output to the SDRAM and also controls when the ports 456, 457 are loaded.

Each memory sequencer state machine 328, 330, 332, and 334 stores pointers in registers 464 which include a current state machine entry pointer and a current state machine beat pointer. For state machine 0, the current state machine entry pointer and current state machine beat pointer are denoted current_stm0_entry_ptr 482 and current_stm0_beat_ptr 484, respectively.

The master entry pointer 451 is used by the memory sequencer state machines 328–334 to access the input fifo in the command queue. The master entry pointer 486 is also used by the memory sequencer state machines and the SDC programmable register subunit. When a transaction is to be translated and output, the master entry pointer is used to load the appropriate state machine register with the address and cycle select information from the input fifo. For example, for state machine STM0 328, state machine register STM REG 0 451 will be loaded when a read or write transaction is to internal bank 0, that is, when address bits 5 and 6 are both 0 or low. When four consecutive read transactions access different internal SDRAM banks, the master entry pointer will be incremented or changed for each read transaction.

However, if two consecutive read transactions access the same internal bank of the SDRAM the master entry pointer will not be incremented. In other words, the memory sequencer 110 waits for the first transaction to complete and does not pipeline those consecutive transactions.

The logic unit 466 of the memory sequencer state machines 328–334 monitors the valid V bit of the command fifo entries. If the valid bit is set the complete transaction has been received by the input fifo and the appropriate state machine processes the transaction. For read transactions, once a state machine begins to process the transaction, that state machine increments the master entry pointer to point to the next entry in the command fifo.

For a write transaction, if the Valid bit for an entry in the input fifo is set, a state machine logic block 460 copies the master entry pointer 450 and master beat pointer 451 into the current state machine entry pointer and beat pointer, 482 and 484, respectively. The logic block 460 also loads all data stored in the input fifo into the port 456. For write transactions, the master entry pointer is not incremented until the data in port 456 has be output to the SDRAM.

If the command fifo transaction is to access the SDC programmable registers, all state machines ignore that transaction, and the SDC register subunit increments the master entry pointer.

For a transaction that is being processed by a state machine, the address and cycle select fields are stored in the corresponding state machine register (STM REG0-STM REG 3).

Memory Sequencer State Machines and the Flags

The logic block 466 of the flag block 366 uses the cycle select information stored in the state machine registers STM REG 0-STM REG 3 to generate the memory cycle compare flags 494. All four state machines use the compare flags 494 to synchronize the pipelining of memory accesses. Table 8 summarizes the state machine flags 494.

TABLE 8

| Previous Transaction | Current Transaction | Which internal banks | cycle compare flags |
|---|---|---|---|
| Read | Read | Same | 000 |
| | Read | Different | 001 |
| | Write | Same | 010 |
| | Write | Different | 011 |
| Write | Read | Same | 100 |
| | Read | Different | 101 |
| | Write | Same | 110 |
| | Write | Different | 111 |

In addition, the datapath unit 324 has a programmable divider 496 that is connected to the MCF bits of the configuration register that divides the processor clock ck_clk 116 by the desired factor to output the memory clock mclk 140.

Figure 17:
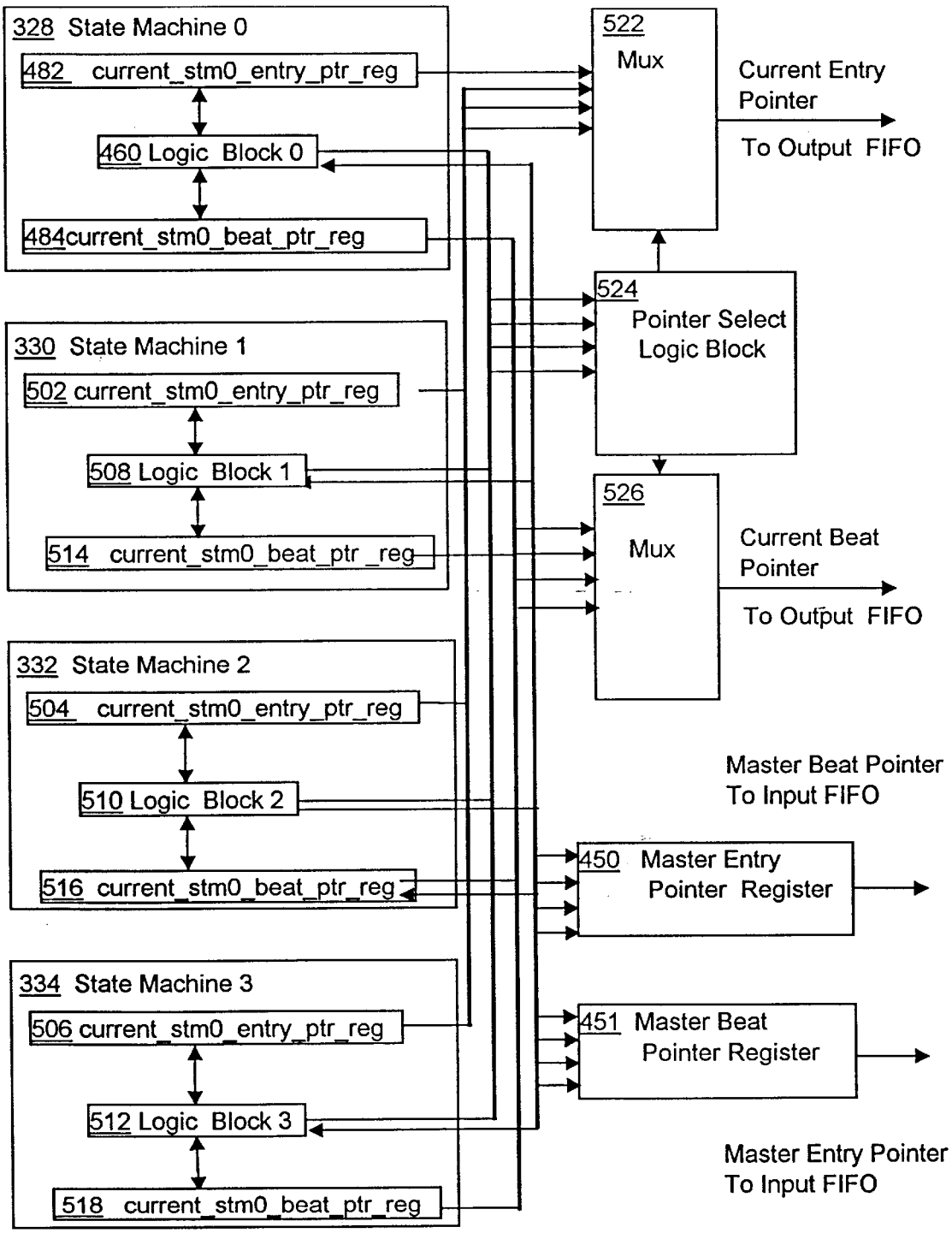
FIG. 17 is detailed block diagram of the memory sequencer pointer control logic.

FIG. 17 is detailed block diagram of the memory sequencer pointer control logic. Each state machine 328, 330, 332, 334 has a current state machine entry pointer register 482, 502, 504, 506, logic block 460, 508, 510, 512 and current state machine beat register 484, 514, 516, 518, respectively. Each of the current state machine entry pointer registers 482, 502, 504, 506, is input to the multiplexor 522.

Each logic block 460, 508, 510, 512 of the state machines connects to the pointer select logic block 524. In response to the logic blocks of the state machines, the pointer select logic block 524 outputs one of the current state machine entry pointers stored in the current state entry pointer registers 482, 502, 504, 506, as the current entry pointer.

Similarly, the output of each of the current state machine beat pointer registers 484, 514, 516, 518, is input to the multiplexor 526. In response to the logic blocks of the state machines, the pointer select logic block 524 outputs one of the current state machine beat pointers stored in the current state beat pointer registers 484, 514, 516, 518, as the current beat pointer.

The state machine logic blocks 460, 508, 510, 512 also increment the master entry pointer register 450 and master beat pointer register 451 at the appropriate times.

Figure 18:
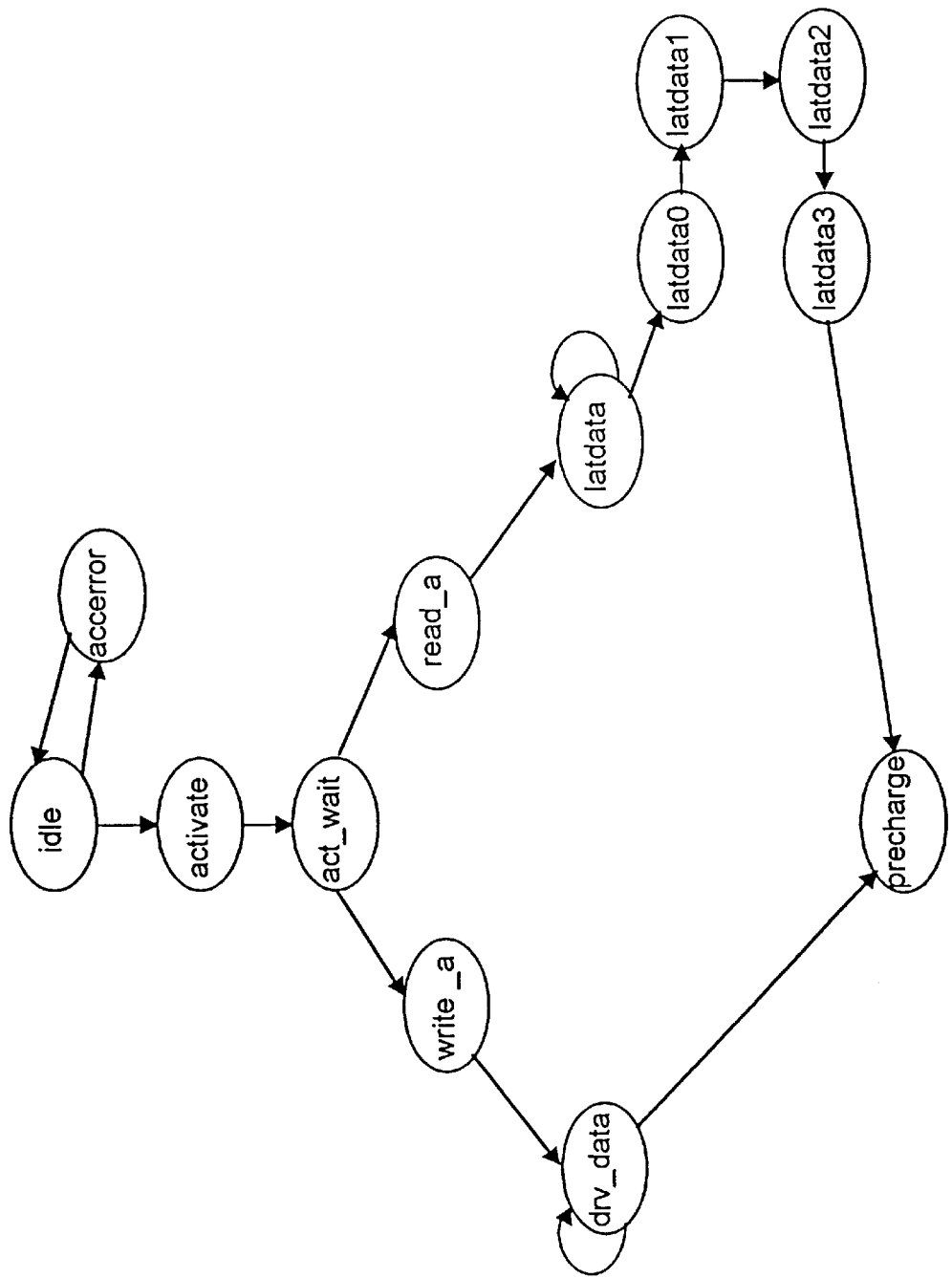
FIG. 18 is an exemplary state diagram for a state machine of the memory sequencer.

FIG. 18 is a state diagram that depicts the overall operation of the state machines. Table 9 describes the transitions between states for the state machine and describes the state transitions for FIG. 18.

TABLE 9

| Current State | Conditions and Actions | Next State |
|---|---|---|
| idle | Load all counters with timing parameters, and reset data beat counters | idle |
| | All conditions are checked after determining that there is a valid transaction, the SDC is enabled, there is no refresh request and the power on sequence is done. If other state machines are idle OR if (cycle compare flags = 1 or 3 or 5 or 7) and if the other state machines are busy and have given an okay to activate signal, make a local copy of the current entry pointer and then increment the current entry pointer. Load the activate to read/write (Trcd) counter. Memory cycle and if SDRAM address does not match base register address or address out of bounds | activate accerr |
| accerror | assert error signal to SDC register | idle |
| activate | Start counting/enable activate to read/write counter (Trcd) Output SDRAM Activate command to SDRAM Assert activate okay signal | actwait |
| actwait | Decrement activate to read/write counter (Trcd) After 2 decrements, negate activate okay signal, Once counter expires, then If transaction is at the top of the command queue and read access OR if (cycle compare flags = 0 or 4) OR (if cycle compare flags = 1) and other state machines okay read or are in the idle state | reada |
| | If transaction is at the top of the command queue and write access OR if (cycle compare flags = 2 or 6) OR if (cycle compare flags = 3 or 7) and other state machines are idle or in precharge state | writea |
| reada | Output read with auto precharge command to SDRAM. Start CAS latency counter. Assert okay to activate signal. | latdata |
| latdata | Decrement CAS latency counter. Once counter expires, latch 4 beats of data in the output FIFO. If CAS latency is 3, then when CAS latency counter is 2, assert okay to read signal. If CAS latency is 2, then when CAS latency counter is 1, assert okay to read signal. | latdat0 |

TABLE 9-continued

| Current State | Conditions and Actions | Next State |
| --- | --- | --- |
| latdata0 | beat pointer = 0, store data beat 0 in data return FIFO, set valid bit in the data return unit for data beat 0 increment beat pointer | latdata1 |
| latdata1 | beat pointer = 1, store data beat 1 in data return FIFO, set valid bit in the data return unit for data beat 1 increment beat pointer | latdata2 |
| latdata2 | beat pointer = 2, store data beat 2 in data return FIFO, set valid bit in the data return unit for data beat 2 increment beat pointer | latdata3 |
| latdata3 | beat pointer = 3, store data beat 3 in data return FIFO, set valid bit in the data return unit for data beat 3 assert precharge to activate counter enable signal. | precharge |
| writea | Output the write with auto precharge (WRTA) command to the SDRAM. Assert okay to activate signal. Output the first data beat to the SDRAM. | drvdata |
| drvdata | Output the three remaining data beats to the SDRAM. If CAS latency is 3, assert the wr_okay signal while driving the 2nd data beat. If CAS latency is 2, assert the wr_okay signal while driving the 3rd data beat. While driving the 4th data beat, clear the valid bit in the command FIFO. | precharge |
| precharge | Decrement the precharge to activate counter. Once counter equals 0, go to next state. Increment the master entry pointer. | idle |

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus for controlling an array of synchronous memory devices, comprising:
    a memory controller having:
        a high speed interface configured to be coupled to an execution unit of a computer system, the high speed interface having a buffer with entries for receiving transactions, wherein said buffer has a valid bit for each entry, said entries store transactions received from a high speed bus; and
        a low speed interface configured to be coupled to an array of synchronous memory devices, wherein the low speed interface retrieves transactions from said buffer, said high speed interface and said low speed interface each have state machines that use said valid bit for each of said entries to synchronize said high speed interface with respect to said low speed interface;
    wherein the memory controller is configured to pipeline consecutive accesses between the memory controller and a synchronous dynamic random access memory (SDRAM) to efficiently use a data bus of the SDRAM by overlapping consecutive accesses, the accesses including read and write accesses, the read and write accesses each having an activate phase followed by a command phase.

2. The apparatus of claim 1, wherein the memory controller is configured to receive through the high speed interface an execution unit clock signal from the execution unit.

3. The apparatus of claim 2, wherein the execution unit clock signal has a clock speed equal to the speed of a processor in the execution unit.

4. The apparatus of claim 1, wherein the memory controller is configured to output a memory clock signal through the low speed interface, the memory clock signal derived from the execution unit clock signal.

5. The apparatus of claim 4, wherein the memory controller further includes a programmable register for storing one or more memory clock frequency bits.

6. The apparatus of claim 5, wherein the memory controller is configured to derive the memory clock signal by dividing the execution unit clock speed by a pre-determined value corresponding to the one or more memory clock frequency bits.

7. The apparatus of claim 1, wherein for write accesses the memory controller is configured to output an activate command followed by a read without auto-precharge command, and for read accesses the memory controller is configured to output an activate command followed by a read without auto-precharge command.

8. The apparatus of claim 7, wherein the memory controller is configured to receive in a first time frame a first read access to a first SDRAM internal bank and a first SDRAM rank and to receive in a next consecutive time frame a second read access;
    wherein the memory controller is further configured such that,
        (a) if the second read access is to the first SDRAM internal bank and the first SDRAM rank, the memory controller does not overlap the activate phase and command phase of the second read access over the transmission of data from the first read access;
        (b) if the second read access is to the first SDRAM internal bank, but is not to the first SDRAM rank, the memory controller overlaps the command phase and the activate phase of the second read access over the transmission of data from the first read access; and
        (c) if the second read access is not to the first SDRAM internal bank, the memory controller overlaps the command phase and activate phase of the second read access over the transmission of data from the first read access.

9. The apparatus of claim 7, wherein the memory controller is configured to receive in a first time frame a read access to a first SDRAM internal bank and a first SDRAM rank and to receive in a next consecutive time frame a write access;
    wherein the memory controller is further configured such that,
        (a) if the write access is to the first SDRAM internal bank and the first SDRAM rank, the memory controller does not overlap the activate phase and command phase of the write access over the transmission of data from the read access;

(b) if the write access is to the first SDRAM internal bank, but is not to the first SDRAM rank, the memory controller overlaps the activate phase, but not the command phase, of the write access over the transmission of data from the read access; and (c) if the write access is not to the first SDRAM internal bank, the memory controller overlaps the activate phase, but not the command phase, of the write access over the transmission of data from the read access.

10. The apparatus of claim 7, wherein the memory controller is configured to receive in a first time frame a write access to a first SDRAM internal bank and a first SDRAM rank and to receive in a next consecutive time frame a read access;

wherein the memory controller is further configured such that, (a) if the read access is to the first SDRAM internal bank and the first SDRAM rank, the memory controller does not overlap the activate phase and command phase of the read access over the transmission of data from the write access;

(b) if the read access is to the first SDRAM internal bank, but is not to the first SDRAM rank, the memory controller overlaps the command phase and activate phase of the read access over the transmission of data from the write access; and (c) if the read access is not to the first SDRAM internal bank, the memory controller overlaps the command phase and activate phase of the read access over the transmission of data from the write access.

11. The apparatus of claim 7, wherein the memory controller is configured to receive in a first time frame a first write access to a first SDRAM internal bank and a first SDRAM rank and to receive in a next consecutive time frame a second write access;

wherein the memory controller is further configured such that, (a) if the second write access is to the first SDRAM internal bank and the first SDRAM rank, the memory controller does not overlap the activate phase and command phase of the second write access over the transmission of data from the first write access;

(b) if the second write access is to the first SDRAM internal bank, but is not to the first SDRAM rank, the memory controller overlaps the activate phase, but not the command phase, of the second write access over the transmission of data from the first write access; and (c) if the second write access is not to the first SDRAM internal bank, the memory controller overlaps the activate phase, but not the command phase, of the second write access over the transmission of data from the first write access.

12. An apparatus comprising:

an execution unit of a computer system;

an array of synchronous memory devices; and a memory controller having:

a high speed interface configured to be coupled to the execution unit, the high speed interface having a buffer with entries for receiving transactions, wherein said buffer has a valid bit for each entry, said entries store transactions received from a high speed bus; and a low speed interface configured to be coupled to the array of synchronous memory devices, wherein the low speed interface retrieves transactions from said buffer, said high speed interface and said low speed interface each have state machines that use said valid bit for each of said entries to synchronize said high speed interface with respect to said low speed interface;

wherein the memory controller is configured to pipeline consecutive accesses between the memory controller and a synchronous dynamic random access memory (SDRAM) to efficiently use a data bus of the SDRAM by overlapping consecutive accesses, the accesses including read and write accesses, the read and write accesses each having an activate phase followed by a command phase.

* * * * *